United States Patent [19]

Watanabe et al.

[11] Patent Number: 5,585,840
[45] Date of Patent: Dec. 17, 1996

[54] ENDOSCOPE APPARATUS IN WHICH IMAGE PICKUP MEANS AND SIGNAL CONTROL MEANS ARE CONNECTED TO EACH OTHER BY SIGNAL TRANSMITTING MEANS

[75] Inventors: Akira Watanabe; Kenichi Kikuchi; Yasuo Komatsu, all of Hachioji, Japan

[73] Assignee: Olympus Optical Co., Ltd., Tokyo, Japan

[21] Appl. No.: 397,728

[22] Filed: Mar. 2, 1995

Related U.S. Application Data

[63] Continuation of Ser. No. 72,460, Jun. 7, 1993, abandoned.

[30] Foreign Application Priority Data

Jun. 11, 1992 [JP] Japan .................................. 4-152116
Jun. 17, 1992 [JP] Japan .................................. 4-158237

[51] Int. Cl.⁶ ........................................................ H04N 7/18
[52] U.S. Cl. ........................... 348/66; 348/66; 348/67; 348/68; 348/70
[58] Field of Search ................................. 348/65, 67, 68, 348/69, 70, 66

[56] References Cited

U.S. PATENT DOCUMENTS

| | | | |
|---|---|---|---|
| 4,667,230 | 5/1987 | Arakawa | 348/65 |
| 4,831,444 | 5/1989 | Kato | 348/69 |
| 4,845,555 | 7/1989 | Yabe et al. | 348/65 |
| 4,860,095 | 8/1989 | Kimura et al. | 348/65 |
| 4,868,647 | 9/1989 | Uehara et al. | 348/69 |
| 4,905,668 | 3/1990 | Oshawa | 348/65 |
| 4,926,258 | 5/1990 | Sasaki | 348/69 |
| 4,967,269 | 10/1990 | Sasagawa et al. | 348/65 |
| 5,088,492 | 2/1992 | Takayama et al. | 348/65 |
| 5,113,524 | 5/1992 | Kanno et al. | 348/65 |

*Primary Examiner*—Tommy P. Chin
*Assistant Examiner*—Anand Rao
*Attorney, Agent, or Firm*—Armstrong, Westerman, Hattori, McLeland & Naughton

[57] ABSTRACT

A detection signal of an image pickup device is inputted to a gate circuit to open the gate circuit by a gate signal from a drive-signal generating circuit during a period of time of a phase regulating signal section of a drive signal, to thereby output the detection signal during the period of time, to a reference reset generating circuit. The reference reset generating circuit generates a reference reset signal on the basis of the detection signal during a period of time of the inputted phase regulation signal section. The reference reset signal and a basic clock signal are inputted to a timing-pulse generating circuit for generating various kinds of timing pulses which are used in an image-pickup-signal processing circuit for processing in signal the image pickup signal.

12 Claims, 30 Drawing Sheets

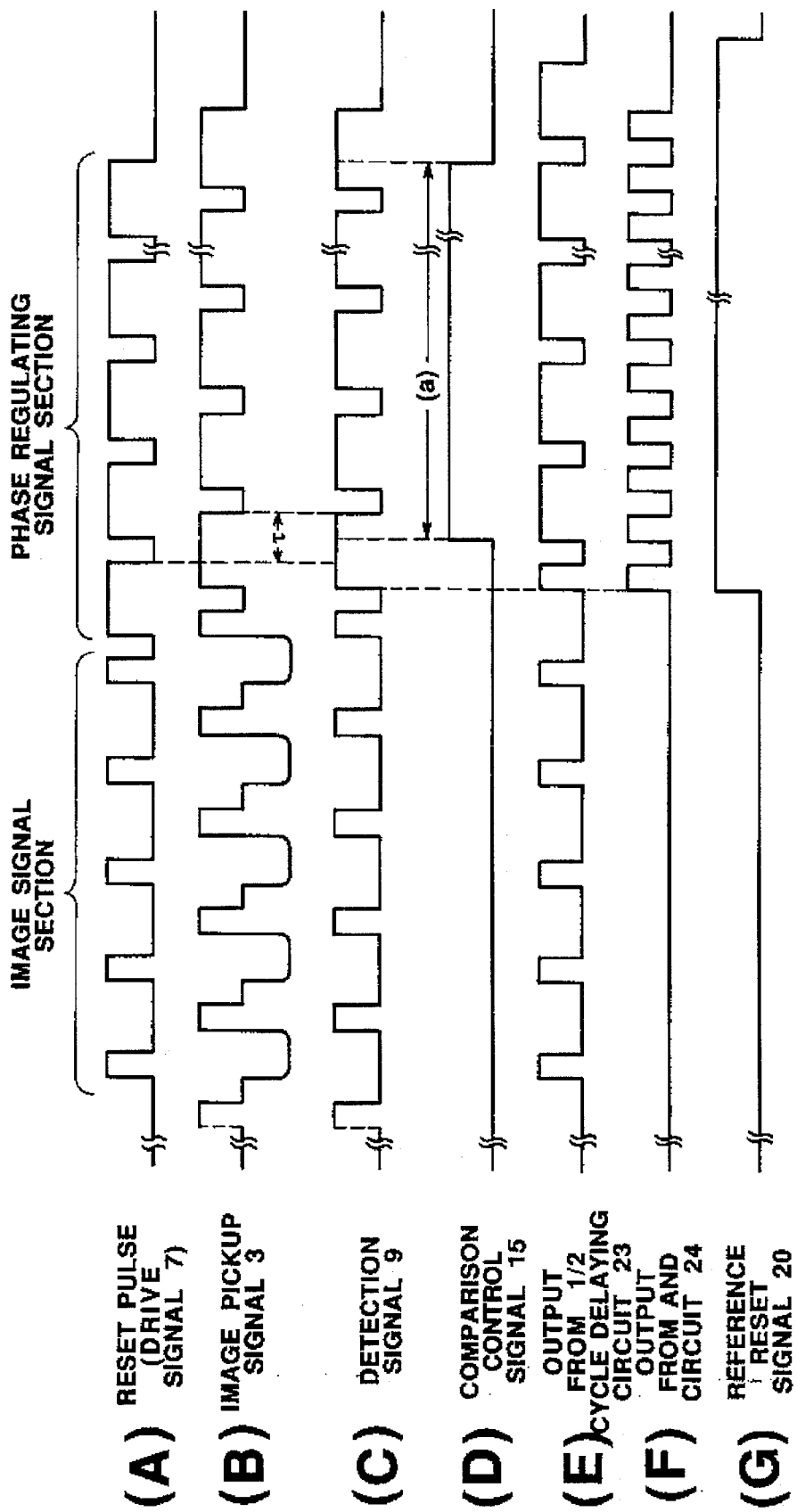

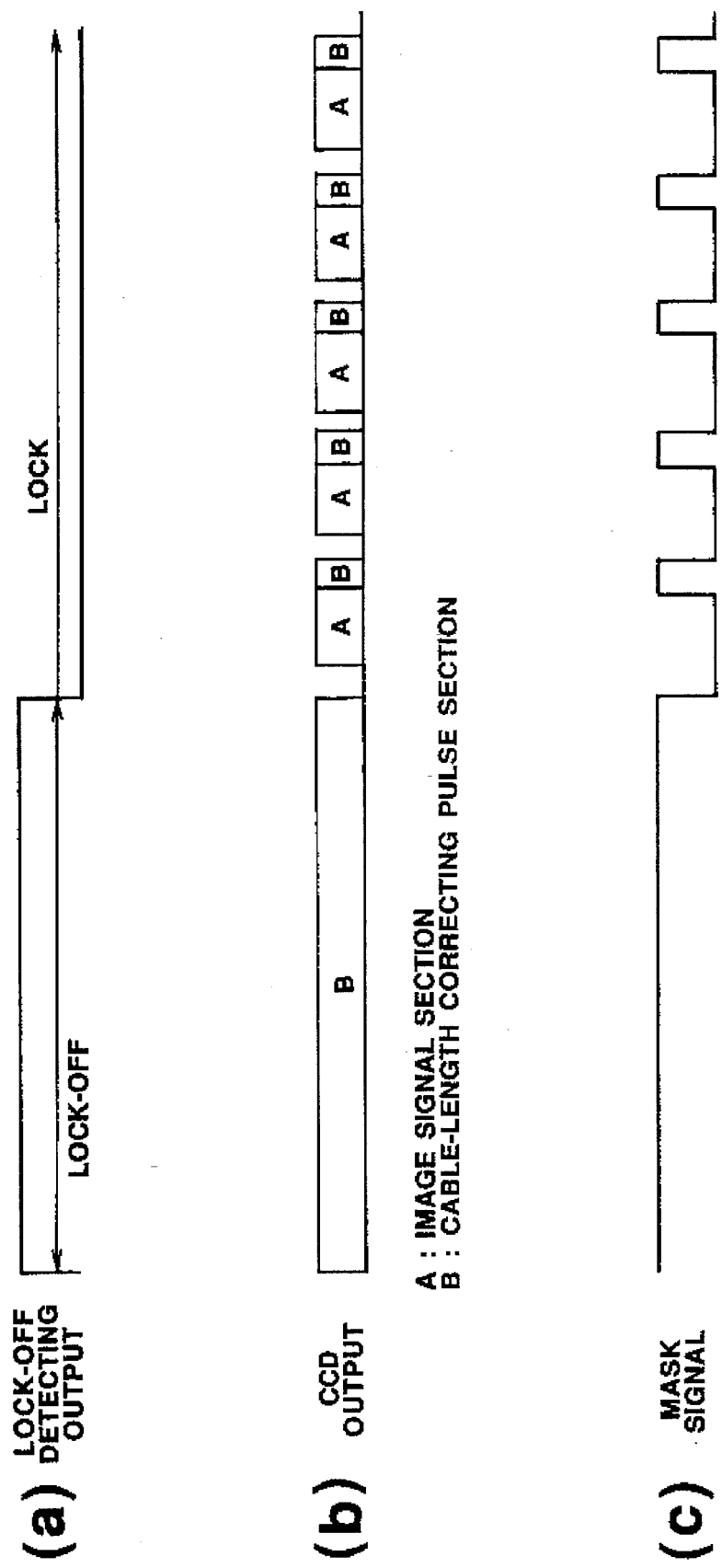

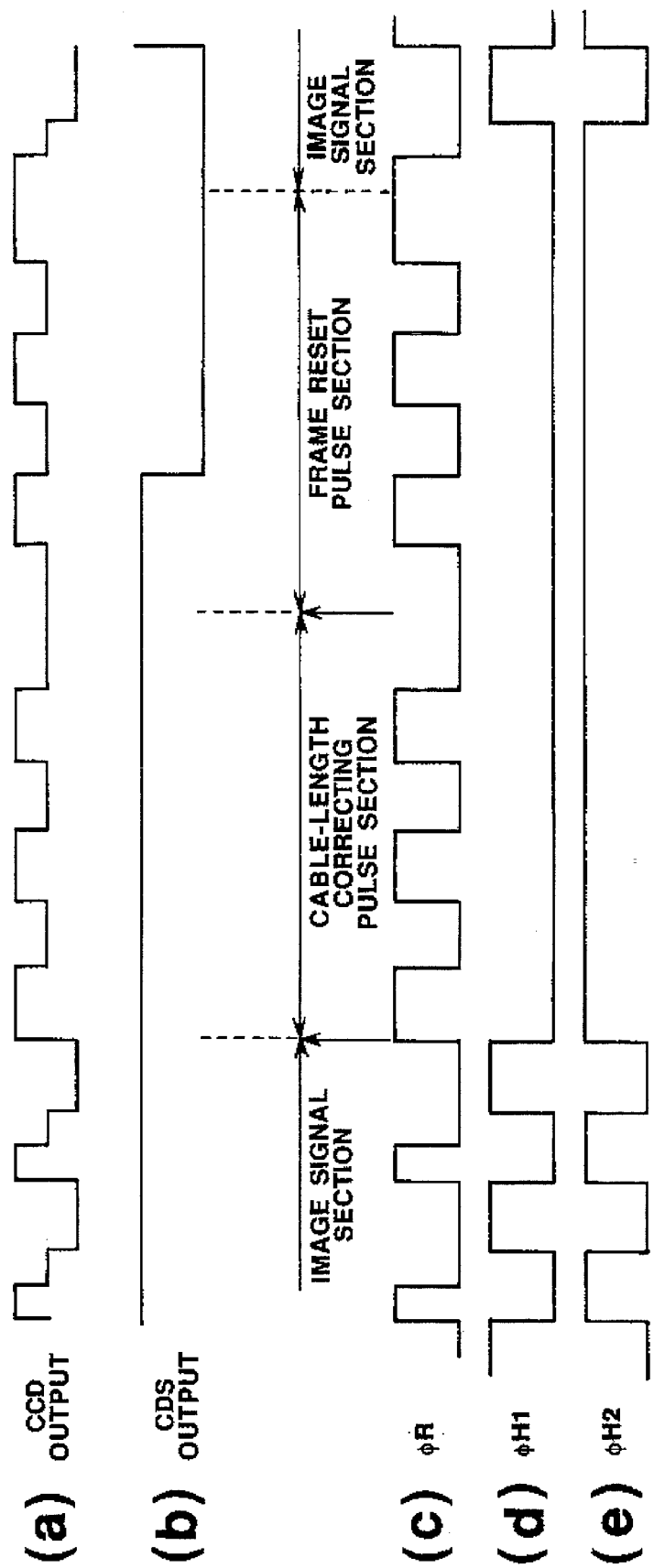

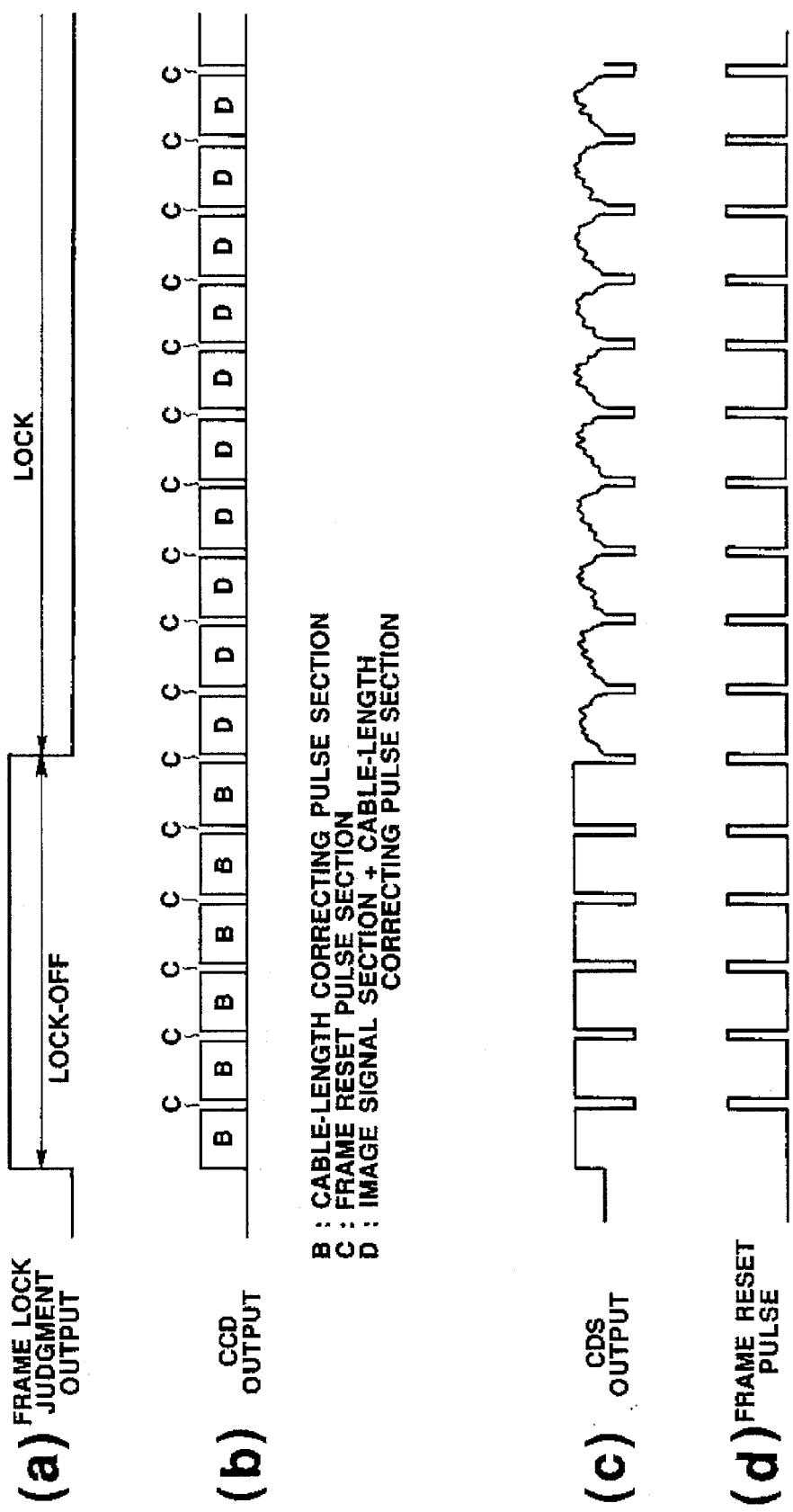

ENDOSCOPE APPARATUS IN WHICH IMAGE PICKUP MEANS AND SIGNAL CONTROL MEANS ARE CONNECTED TO EACH OTHER BY SIGNAL TRANSMITTING MEANS

This application is a continuation of application Ser. No. 08/072,460 filed Jun. 7, 1993, now abandoned.

BACKGROUND OF THE INVENTION

1. Field of the Invention

The present invention relates to an endoscope apparatus in which an image pickup means and an image processing means are connected to each other by image transmitting means and, more particularly, to an endoscope apparatus in which an image pickup signal at a signal transmitting means is corrected for a delay time error.

2. Description of the Related Art

Conventionally, in an image pickup device of a so-called separation type in which a camera head section serving as image pickup means and a camera control unit serving as image processing means are separated from each other has the following disadvantage. That is, if length of a camera cable for transmitting an image pickup signal from a camera head is changed or altered, an error is generated in the propagation delay time of the image pickup signal. Thus, a circuit must be regulated such that the propagation delay time error is corrected each time the error is generated. For this reason, not only the operation of the image pickup device is complicated, but it is also impossible to perform regulation of the propagation delay time error with high accuracy. Particularly, in a case where signal processing such as optical black clamp is accurately performed with respect to the image signal as is in a high-grade television, the aforesaid disadvantage becomes or creates a large problem.

In order to solve the above-discussed disadvantage, Japanese Patent Laid-Open No. SHO 62-82782 (82782/1987) discloses a television camera apparatus in which a third cable is added which transmits a control signal to the outside of a cable for transmitting an image signal read out from a CCD and a cable for transmitting a drive signal of the CCD, a drive pulse is transmitted which is used to read out the CCD to a video processor section from a camera section through the third cable, and the drive pulse is utilized to sample the image signal read out from the CCD.

Further, Japanese Patent Laid-Open No. SHO 61-187470 (187470/1986) discloses a television camera apparatus in which a reset pulse contained or included in a CCD output signal supplied to a video processor section from a camera section is extracted, a sampling pulse synchronized with a phase of the reset pulse is created by a phase locked oscillator, and the CCD output signal is held in sample by the sampling pulse to take out or fetch the image signal.

However, the television camera apparatus disclosed in the aforesaid Japanese Patent Laid-Open No. SHO 62-82782 has a disadvantage that, in order to detect a cable length, a control cable is required to be additionally arranged in addition to the cable for transmitting a drive signal for driving the CCD and the cable for transmitting the image signal read out from the CCD to the video processor section and, thus, the arrangement is correspondingly complicated in structure. Particularly, in a case of a video end scope, since it is necessary or required to reduce a diameter of an inserting section, it is extremely difficult to additionally arrange the cable.

Moreover, the television camera apparatus disclosed in Japanese Patent Laid-Open No. SHO 61-187470 is influenced upon the reset signal due to amplitude of the image signal since the sampling pulse is prepared or generated by the reset signal including an image signal duration which is sent from the CCD. Thus, it is difficult to prepare steady and accurate or exact sampling pulse. Furthermore, in a case where delay equal to or more than one or single picture element occurs in the image signal, following is performed with respect to the sampling pulse every one picture element. However, it is difficult to exactly generate a sampling pulse every equal to or more than two picture elements as is in color demodulation of a single-plate color tip camera having a mosaic color filter.

In view of the above, a television camera apparatus is disclosed in Japanese Patent Laid-Open No. HEI 1-132280 (132280/1989) in which a reset signal only in an invalid image area or region of an image signal is extracted to regenerate a sampling pulse.

A conventional example will hereunder be described with reference to the accompanying drawings.

As shown in FIG. 35, a standard signal generator (hereinafter referred to "SSG1") 81 generates CCD drive pulses ($\phi$R, $\phi$H1, $\phi$H2) which are outputted to a CCD driver 84 for driving a solid-state image pickup element, for example, a CCD 83, from an output from a quartz generator (hereinafter referred to as "CXO") 82. As shown in FIG. 36, each of the CCD drive pulses is divided into an image signal section and a cable-length correcting pulse section during one cycle of a horizontal synchronous signal. At the image signal section, the CCD 83 is driven by CCD drive pulses of $\phi$R, $\phi$H and $\phi$V. At the cable correcting pulse section, the CCD 83 is driven only by $\phi$R of duty of 50%. In the image pickup signal from the CCD 83 driven in this manner, the cable-length correcting pulse section is extracted by a mask signal (FIG. 37) from an SSG2 (86) at a mask circuit 85. The image pickup signal from the CCD 83 is formed into a digital signal by a limiter amplifier 87. Further, the image pickup signal from the CCD 83 is compared in phase with an output from a voltage control oscillator (hereinafter referred to as "VCXO") 89 by a phase comparing circuit 88. The VCXO 89 is controlled by an output from the phase comparing circuit 88. Thus, a phase of the output from the VCXO 89 is conformed to a phase of waveform of the cable-length correcting pulse section. A PLL is arranged in this manner, the CDS clock is generated at a CDS clock generator 90 on the basis of an output from the VCXO 89 which is synchronized with the waveform of the cable-length correcting pulse section, and a CDS 91 performs correlation double sampling with respect to the image pickup signal by the CDS clock, to thereby obtain an image signal of a base band. Further, the SSG2 (86) generates a timing pulse for an image signal on the basis of an output from the VCXO 89 and H and V reset signals from the SSG1 81. An image processing circuit 92 processes in signal the output from the CDS 91 and performs outputting as a normal or usual image signal (FIG. 38).

In this manner, conventionally, since signal processing is performed on the basis of the waveform at the cable-length correcting pulse section which is superimposed upon the output from the CCD 83, a propagation delay-time error due to the cable length can be corrected to perform signal processing.

However, also in Japanese Patent Laid-Open No. HEI 1-132280, measures are not taken with respect to delay equal to or more than two picture elements due to the cable.

Moreover, the above-described prior art has the following disadvantages. That is, since the cable-length correcting pulse is superimposed into the form of burst every horizontal synchronization, time is taken from a condition in which lock of a PLL is off upon turning-ON of a power source and so on to a condition where the PLL is locked, so that the image signal is disturbed.

SUMMARY OF THE INVENTION

It is an object of the invention to provide an endoscope apparatus which can prevent an image signal from being deteriorated or degraded on the basis of fluctuation in delay time of a signal due to a difference in length of a cable, by a simple arrangement.

It is an another object of the invention to provide an endoscope apparatus which can correct a propagation delay time error due to a cable length to perform signal processing, and which can bring a lock-off condition of a PLL to a PLL lock condition for a short period of time, by a simple arrangement.

According to the invention, there is provided an endoscope apparatus comprising:
- an endoscope provided with an inserting section which is inserted into a lacuna;
- image pickup means for image-picking-up an observing part within the lacuna; and
- signal processing means for driving the image pickup means and for processing an image pickup signal from the image pickup means,
- wherein the signal processing means is provided with:
  - drive-signal generating means for generating a drive signal which drives the image pickup means;
  - signal superimposing means for superimposing a control signal upon the drive signal;
  - separating and extracting means for separating and extracting the control signal from the image pickup means; and
  - timing-pulse generating means for generating a timing pulse which processes the image pickup signal on the basis of an output from the separating and extracting means.

BRIEF DESCRIPTION OF THE DRAWINGS

FIG. 4 to 7 relates to a second embodiment of the invention, FIG. 4 representing a block diagram showing an arrangement of a principal portion of an image pickup device, FIG. 5 representing a timing chart showing function of each of signals of the image pickup device, FIG. 6 representing a block diagram showing an arrangement of an absolute phase detection circuit, and FIG. 7 representing a waveform view showing a phase information signal other than an image pickup signal;

FIGS. 23 to 25 (a), (b) and (c) relate to a fifth embodiment of the invention, FIG. 23 representing a block diagram showing an arrangement of an image pickup device, FIG. 24 representing a block diagram showing an arrangement of a lock-off detecting circuit, and FIGS. 25 (a), (b) and (c) representing a timing chart for explanation of timing of each of signals;

FIGS. 26 to 29 (a)–(d) relate to a sixth embodiment of the invention, FIG. 26 representing a block diagram showing an arrangement of an image pickup device, FIG. 27 representing a circuit view showing an arrangement of a frame lock judging circuit, FIGS. 28 (a)–(e) representing a first timing chart for description of timing of each of signals, and FIGS. 29 (a)–(d) representing a second timing chart for description of the timing of each of the signals;

DETAILED DESCRIPTION OF THE PREFERRED EMBODIMENTS

Figure 1:
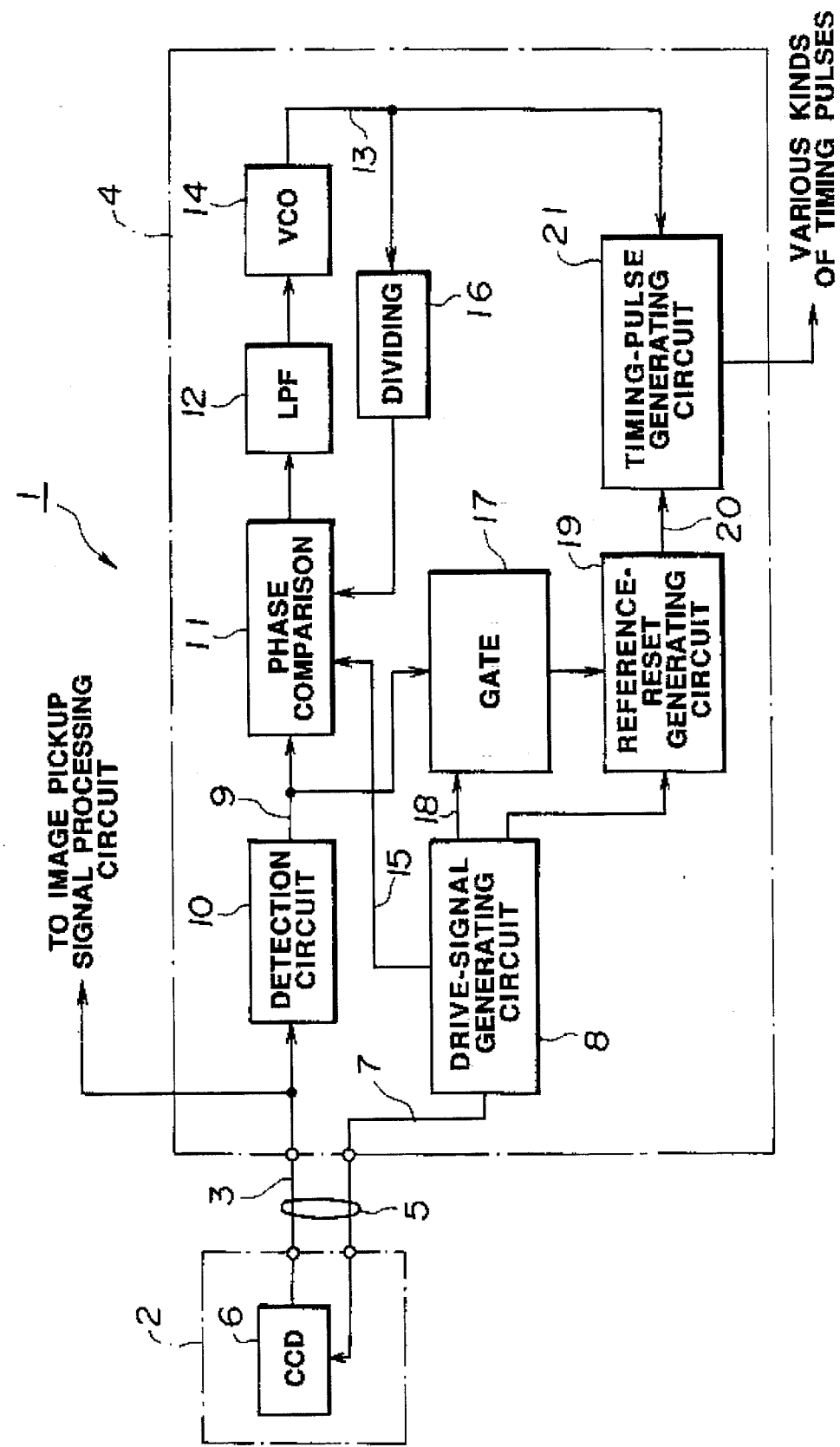
FIGS. 1 to 3 relate to a first embodiment of the invention, FIG. 1 representing a block diagram showing an arrangement of a principal portion of an image pickup device, FIG. 2 representing a timing chart showing function of each of signals of the image pickup device, and FIG. 3 representing a block diagram showing an arrangement of an example of a gate circuit and an example of a reference reset signal generating circuit.

As shown in FIG. 1, an image pickup device 1 according to a first embodiment comprises a camera section 2 serving as image pickup means for image-picking-up a subject, and image processing means having an image-pickup-signal processing circuit (not shown) for processing an image pickup signal 3 from the camera section 2 and a processor section 4 for generating a timing pulse from the image pickup signal 3. The camera section 2 and the processor section 4 are detachably connected to each other by a camera cable 5. The camera section 2 is provided with a solid-state image pickup element, for example, a CCD 6 for electrically transferring an optical image of the subject through an optical lens system (not shown) to generate an image pickup signal.

The processor section 4 comprises a drive-signal generating circuit 8 for generating a drive signal 7 for driving the CCD 6, and a detection circuit 10 for detecting the image pickup signal 3 to generate a detection signal 9.

The detection signal 9 is inputted to a voltage control transmitter (hereinafter referred to as "VCO") 14 for generating a reference clock 13, through a phase comparing circuit 11 and a low-pass filter (hereinafter referred to as "LPF") 12. The phase comparing circuit 11 compares a phase of the detection signal 9 and a phase of an output from a dividing circuit 16 for dividing the reference clock 13 with each other during a predetermined period of time in which a comparing control signal 15 from the drive-signal generating circuit 8 is active, whereby the reference clock 13 that is an output from the VCO 14 is synchronized with the image pickup signal 8 from the CCD 6.

Further, the detection signal 9 is inputted to a gate circuit 17, to open the gate circuit 17 during a period of time of a phase regulating signal section to be described subsequently of the drive signal 7, by a gate signal 18 from the drive-signal generating circuit 8, to thereby output the detection signal 9 during the period of time to a reference reset generating circuit 19. The reference reset generating circuit 19 generates a reference reset signal 20 on the basis of the detection signal 9 during the period of time of the inputted phase regulating signal section. The reference reset signal 20 and the reference clock signal 13 are inputted to a timing-pulse generating circuit 21 for generating various kinds of timing pulses which are used in an image-pickup-signal processing circuit (not shown) for processing in signal the image pickup signal 3.

Operation of the image pickup apparatus 1 arranged as described above will be described.

Figure 2:
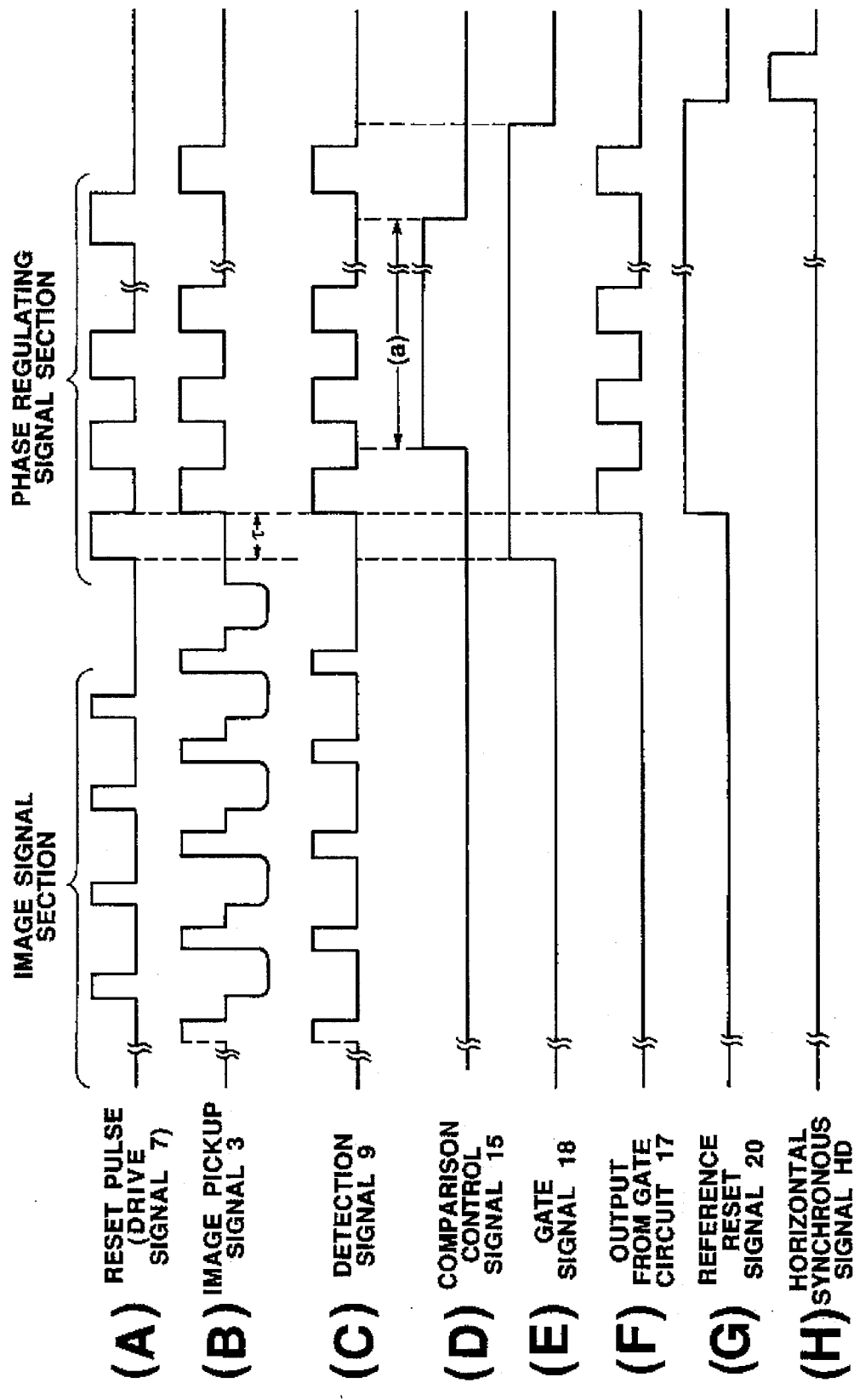

Various kinds of pulses constituting the drive signal 7 are sent to the CCD 6 by the drive-signal generating circuit 8. Here, a reset pulse of the pulses sent to the CCD 6 by the drive-signal generating circuit 8 has, as shown in FIG. 2(A), an ordinary or usual duty ratio or factor (about 25%) during the readout period of time of an image signal section of the CCD 6, and a duty ratio of 50% out of the signal readout period of time (hereinafter referred to as "a phase regulating signal section"). Here, FIG. 2 shows the duty ratio in an H-rate (horizontal synchronization). The non-signal period of time having a predetermined length is placed between the pulse of the image signal section of the reset pulse and the phase regulating signal pulse. In this connection, the non-signal period of time facilitating separation between the reset signal during the image-signal portion period of time and the reset signal during the phase regulating portion period of time by the gate signal 18. If timing is considered, there may be no non-signal period of time.

The image pickup signal 8 of the CCD 6 driven by the drive signal 7 is illustrated in FIG. 2(B). If the image pickup signal 3 is detected by the detection circuit 10 to fetch or take out only a reset portion thereof, there is obtained or produced the detection signal 9 having waveform thereof illustrated in FIG. 2(C). The waveform of the detection signal 9 is one similar to the waveform shown in FIG. 2(A). However, the waveform of the detection signal 9 includes a delay τ due to the camera cable 5 which connects the processor section 4 and the camera section 2 to each other. That is, τ in FIG. 2 varies depending on the length of the camera cable 5.

The detection signal 9 is inputted to the phase comparing circuit 11. At the phase comparing circuit 11, the phase of the detection signal 9 and a phase of a signal in which the reference clock 13 that is an output from the VCO 14 is divided by the divider 16 are compared with each other during a period of time (a) out of the image-signal-portion period of time selected by the comparing control signal 15 from the drive-signal generating circuit 8 as shown in FIG. 2(D). The VCO 14 is so controlled through the LPF 12 that the phases are coincident with each other. As described above, the input reference clock 13 of the timing-pulse generating circuit 21 is in agreement with the timing of the image pickup signal 3 of the CCD 6.

On the other hand, the detection signal 9 is such that only a phase regulation signal section is fetched by the gate signal 18 (FIG. 2(E)) which outputted from the drive-signal generating circuit 8 at the gate circuit 17 (FIG. 2(F)). Since the gate signal 18 starts from a location between the phase regulation signal section and the image signal section of the detection signal 9 in FIG. 2(C), as shown in FIG. 2(E), the output from the gate circuit 17 can be obtained from a first pulse of the phase regulation signal section.

The phase regulation signal section obtained by the gate circuit 17 is inputted to the reference reset signal generating circuit 19 so that the reference reset signal 20 for the timing-pulse generating circuit 21 (FIG. 2(G)) is generated.

Figure 3:
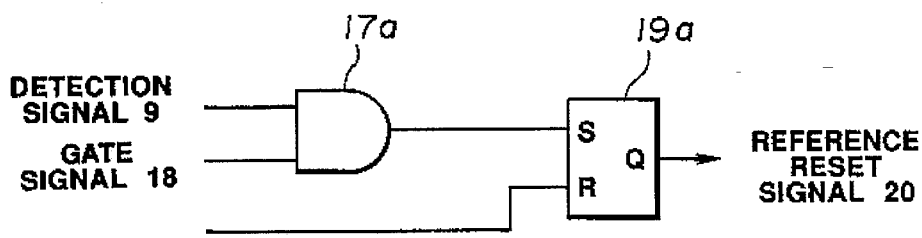

Here, examples of the gate circuit 17 and the reference reset signal generating circuit 19 are shown in FIG. 3. The detection signal 9 and the gate signal 18 are inputted to an AND element 17a at a first step that is the gate circuit 17, and only the phase regulation signal section is fetched. The obtained phase regulation signal section is inputted to a set terminal S of an RS flip-flop 19a at a rear stage that is the reference reset signal generating circuit 19. Further, a horizontal synchronous signal HD (FIG. 2(H)) outputted from the drive signal generating circuit 8 is inputted to a reset terminal R of the RS flip-flop 19a. Then, an RS flip-flip output is brought to the reference reset signal 20 as shown in FIG. 2(G).

Operation of the reference reset is performed by the fact that a leading portion of the reference reset signal 20, for example, is detected within the timing-signal generating circuit 21, and a counter in an H direction (horizontal direction) is reset. Here, reset operation has been described as being an H rate. However, the arrangement may be such that a gate of the reset phase regulation signal is brought to a V rate (vertical synchronization), a reference reset signal is generated at a V cycle, and reset is performed at the V rate.

The timing-pulse generating circuit 21 is driven by the basic clock 13 that is output from the VCO 14, and is reset by the reference reset signal 20. Accordingly, a timing pulse signal is generated which is identical with an absolute phase of the image pickup signal 3 of the CCD 6 which is transmitted through the camera cable 5.

Accordingly, in the image pickup device 1 according to the first embodiment, since the reference reset signal 20 of the timing-pulse generating circuit 21 completely follows the delay of the image pickup signal 3 transmitted by the CCD 6, the phases of the various kinds of timing pulses that are the output from the timing-signal generating circuit 21 are brought to the predetermined timing with respect to the image pickup signal. Thus, it is possible that the sampling pulses for CDSs (correlation double sampling circuits) every one picture element and color demodulation pulses every two picture elements can exactly follow the delay of the image pickup signal 3.

Moreover, since the first embodiment PLL-controls the reference clock signal 20 inputted to the timing pulse generating circuit 21 by a plurality of phase regulation signals even if the transmitting path length is changed, exact phase control is made possible. Furthermore, since the obtained reference reset signal 20 for the timing pulse generating circuit 21 is such that relative time from a specific picture element of the CCD 6 is always constant, processing is made possible by an exact phase, also regarding processing every a plurality of picture elements.

Further, since each signal for phase regulation is inserted into a location outside the image-signal period of time, each signal for phase regulation is not influenced by the level of the image signal. Thus, exact phase regulation is made possible.

In connection with the above, the phase regulation signal section has been described such that the duty ratio is 50%. However, if the above-described object is achieved, the arrangement of the invention is not limited to this specific one.

A second embodiment of the invention will next be described.

Figure 4:
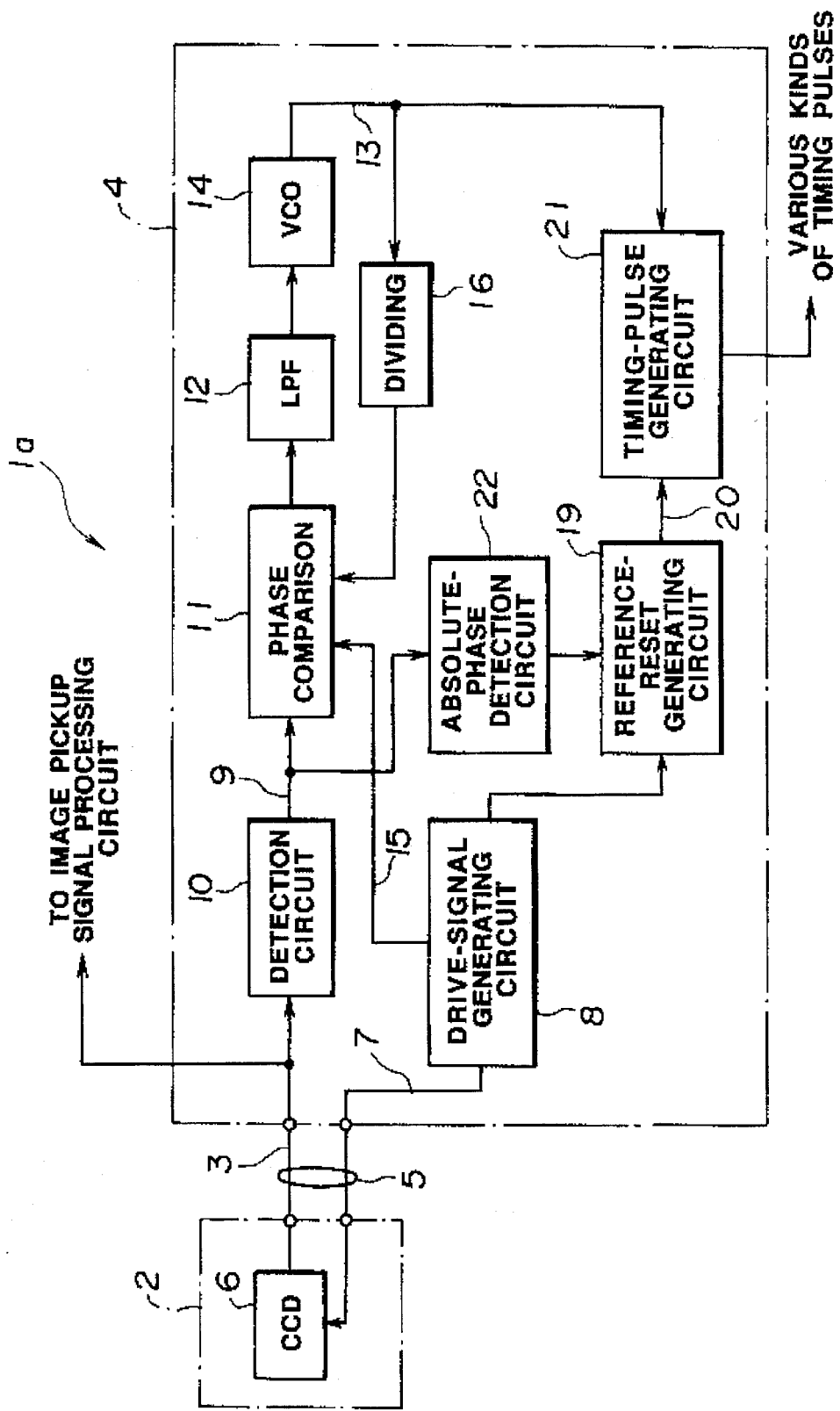

As shown in FIG. 4, an image pickup device 1a according to the second embodiment of the invention is substantially the same as that of the first embodiment of the invention, and is arranged such that a phase regulation signal section of a detection signal 9 is detected by an absolute phase detection circuit 22 in place of the gate circuit 17. The same or identical reference numerals are applied to elements and parts the same as or identical with those of the first embodiment, and the description of the same or identical elements and parts will be omitted.

Figure 6:
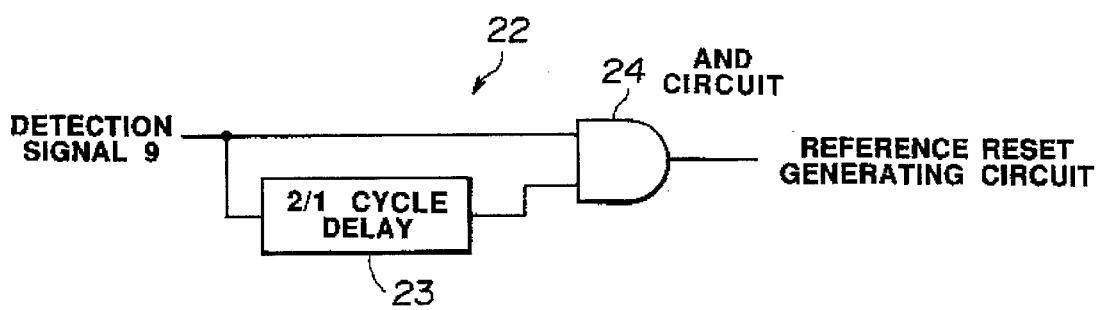

As shown in FIG. 6, the absolute phase detection circuit 22 comprises a ½ cycle delaying circuit 23 for generating a signal in which the detection signal 9 is delayed only through a ½ cycle of a signal of the phase regulation signal section, and an AND circuit 24 for AND-computing an output from the ½ cycle delay circuit 23 and the detection signal 9.

Other arrangements of the image pickup device 1a are the same as those of the first embodiment of the invention.

Operation of the image pickup device 1a arranged in this manner will be described.

Various kinds of pulses that are a drive signal 7 are sent to a CCD 6 by a drive-signal generator 8. Here, as shown in FIG. 5(A), a reset pulse of pulses sent from the drive-signal generator 8 to the CCD 6 is an ordinal or usual duty ratio (about 25%) during the readout period of time of the image signal section and is 75% of the duty ratio out of the signal readout period of time (hereinafter referred to as "a phase regulation signal section"). Here, FIG. 5 shows the pulses by an H-rate.

The image pickup signal of the CCD 6 driven by the drive signal 7 is brought to one illustrated in FIG. 5(B). If the signal is detected to fetch only a reset pulse section, there is produced waveform illustrated in FIG. 5(C). The waveform also includes delay due to a camera cable 5 which connects a processor section 4 and a camera section 2 to each other, similarly to the first embodiment. That is, τ in FIG. 5 is changed in keeping with a length of the camera cable 5.

The detection signal 9 is inputted to a phase comparing circuit 11. At the phase comparing circuit 11, a phase of the detection signal 9 and a phase of a signal in which a reference clock 13 that is an output from a VCO 14 is divided by a divider 16 are compared with each other during the period of time (a) out of the image signal section period of time which is selected by a comparing control signal 15 from the drive signal generating circuit 8 as shown in FIG. 5(D), and the VCO 14 is controlled through an LPF 12 such that the phases are coincident with each other or are agreed with each other. As described above, the input basic clock 13 of a timing pulse generating circuit 21 is in agreement with timing of an image pickup signal 3 from the CCD 6.

On the other hand, the detection signal 9 is inputted to the absolute phase detection circuit 22. At the absolute phase detection circuit 22, the detection signal 9 and an output from a ½ cycle delay circuit 23 (FIG. 5(E)) are AND-computed by an AND circuit 24 (FIG. 5(F)). As shown in FIG. 5(F), the output signal from the AND circuit 24 is such that outputting starts from a location where a duty ratio of the detection signal 9 is just changed. The signal inputted to a basic reset signal generating circuit 19 due to, for example, an RS flip-flop 19a, similarly to the first embodiment of the invention, whereby a reference reset signal 20 (FIG. 5(G)) for the timing-pulse generating circuit 21 is generated. It is possible that reset operation of the timing-pulse generating circuit 21 is similar to that of the first embodiment.

Also in a case of the second embodiment, since the reference reset signal 20 indicates delay of the phase of the transmitted image pickup signal 3, the timing-pulse generating circuit 21 generates a timing pulse signal the same as the absolute phase of the transmitted image pickup signal 3 of the CCD 6, similarly to the first embodiment.

Advantages of the second embodiment are similar to those of the first embodiment. In this connection, as will be seen from the above description, the gate signal is required in a case of the first embodiment. However, in a case of the second embodiment, a gate signal is not required.

Figure 7:
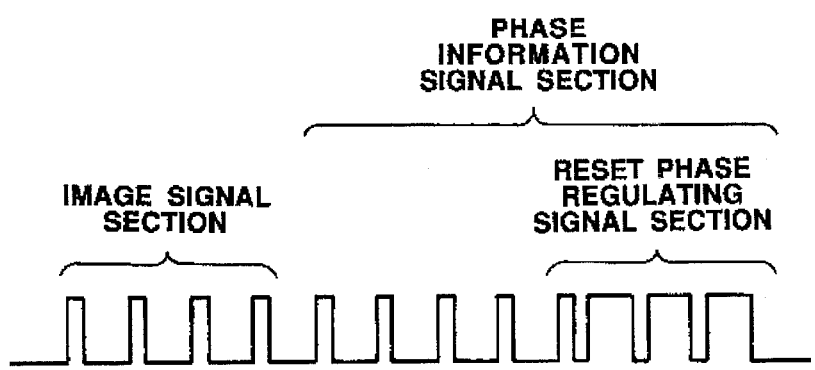

In connection with the above, also in the second embodiment, reset operation has been described as being the H-rate. However, the arrangement may be such that a duty ratio or factor is changed, a portion brought to the reset phase regulation signal is brought to a V-rate, a reference reset signal is generated at a V cycle, and reset is performed by the V-rate. Further, as shown in FIG. 7, the arrangement may be such that the duty ratio is changed from the way of the phase information signal other than the image pickup signal so as to be brought to a reset phase regulating signal.

A third embodiment of the invention will next be described.

Figure 8:
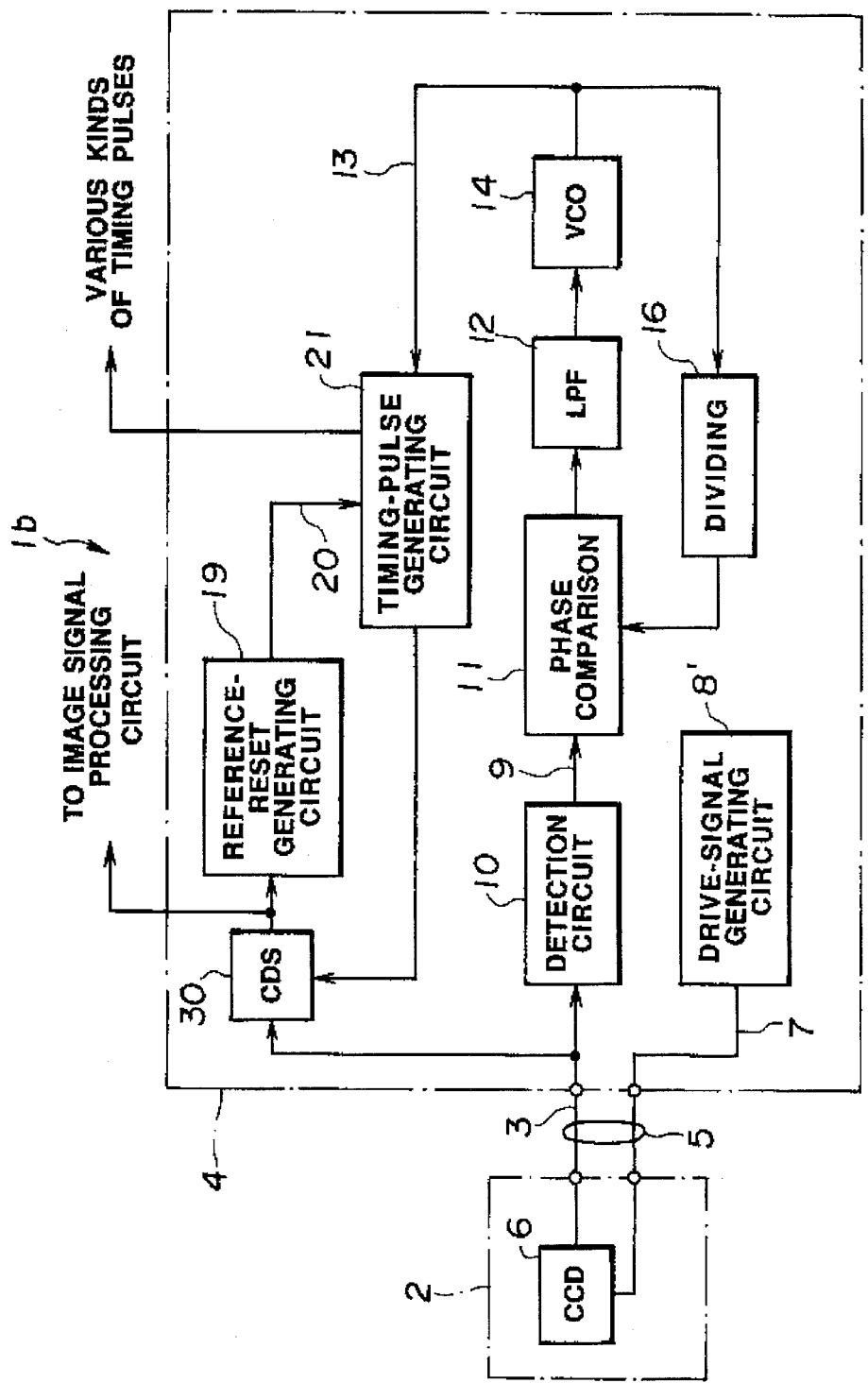
FIG. 8 to 17 relate to a third embodiment of the invention, FIG. 8 representing a block diagram showing an arrangement of a principal portion of an image pickup device, FIG. 9 representing an arrangement view showing an arrangement of a drive signal generating circuit illustrated in FIG. 8, FIGS. 10 (a) 10 (b) and 10 (c) representing, a timing chart showing the function of a drive signal generating circuit in FIG. 8, FIGS. 11 (a–1) representing a timing chart showing function of each of signals of the image pickup device, FIG. 12 representing an arrangement view showing an arrangement of a color filter array, FIGS. 13 (a–e) representing a timing chart for explaining sampling of an image pickup signal due to the color filter array illustrated in FIG. 12, FIGS. 14 (a–e) representing a timing chart for explanation of generation of a sampling pulse in FIG. 13, FIG. 15 representing a timing chart for explanation of a modification of generation of the sampling pulse in FIG. 13, FIG. 16 representing a timing chart showing function of each of signals due to a modification of a reset pulse, and FIG. 17 representing an arrangement view showing an arrangement of an electronic endoscope apparatus which adopts the image pickup device.

As shown in FIG. 8, in an arrangement of an image pickup device 1b according to the third embodiment of the invention, the same or identical reference numerals are applied to the arrangements the same as or identical with those of the first embodiment, and the description thereof will be omitted.

In the third embodiment, an image pickup signal 3 is inputted to a CDS (correlation double sampling) circuit 30. The image pickup signal inputted to the CDS circuit 30 is clamped at a field through portion of the image pickup signal by a clamp pulse and a sampling pulse outputted from a timing pulse generating circuit 21 and, subsequently, an image signal portion is sampled.

Figure 9:
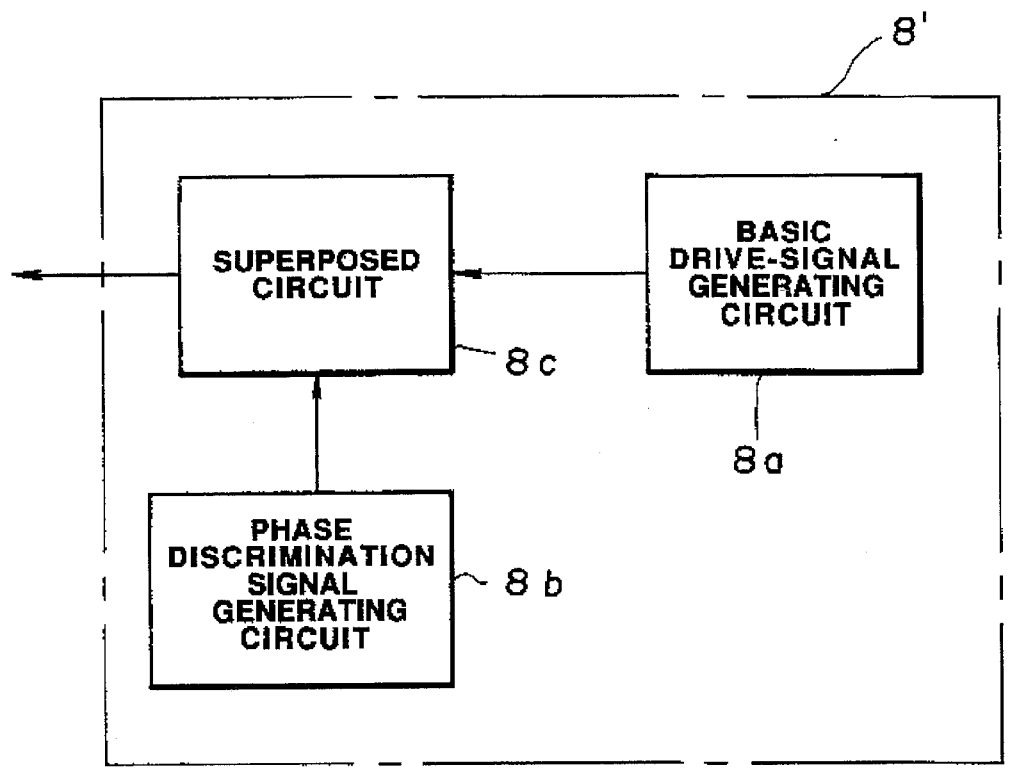

As shown in FIG. 9, a drive signal generating circuit 8' in the third embodiment of the invention comprises a basic drive signal generating circuit 8a for generating a basic drive signal, a phase discrimination signal generating circuit 8b for generating a phase discriminating signal, and a superimposing circuit 8c for superimposing the phase discriminating signal upon the basic drive signal.

Figure 10:
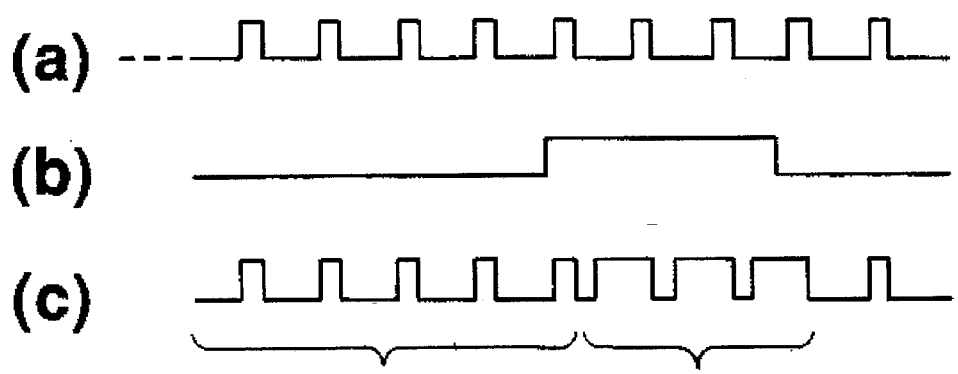

The basic drive signal generating circuit 8a outputs a reset pulse of a basic drive signal as shown in FIG. 10(a). On the other hand, the phase discrimination signal generating circuit 8b outputs a phase discriminating signal as shown in FIG. 10(b). These signals are compounded or synthesized by the superimposing circuit 8c whereby, as shown in FIG. 10(c), the reset pulse of the basic drive signal is modified at timing of the phase discriminating signal to form a synthesized signal. A portion of the signal upon which the discriminating signal is superimposed becomes an absolute phase detection section. A drive signal upon which the phase discriminating signal superimposed is transmitted to the CCD 6.

Other arrangements are the same as those of the first embodiment.

Operation of the image pickup device 1b arranged in this manner will be described.

Various kinds of pulses that are a drive signal 7 are sent to a CCD 6 by the drive signal generating circuit 8'. Here, as shown in FIG. 11(A) (corresponding to FIG. 10(c)), the reset pulse of the pulses sent to the CCD 6 by the drive signal generating circuit 8 is an ordinary or usual duty ratio (about 25%) during the image signal readout period of time, and comprises a phase regulation signal section in which a duty ratio is 25% and an absolute phase detecting section in which the duty ratio is 75%. Leadings of these respective signals are the same in timing as each other. Here, FIG. 9 is shown by an H-rate.

Figure 11:
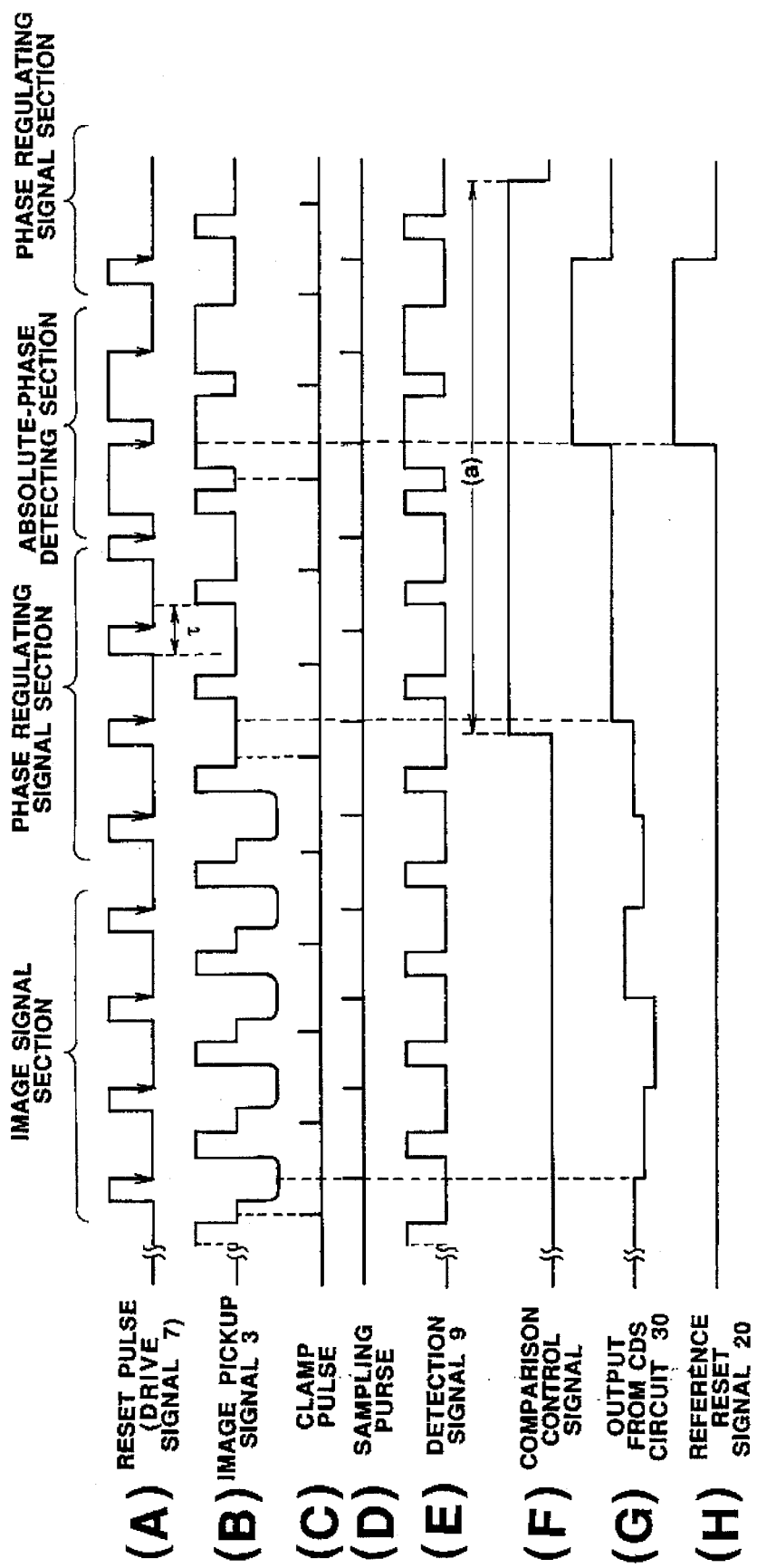

The image pickup signal of the CCD 6 driven by the drive signal 7 is brought to one illustrated in FIG. 11(B). If the signal is detected to fetch only a reset portion, there is produced waveform illustrated in FIG. 11(E). The waveform also includes delay due to a camera cable 5 which connects a processor section 4 and a camera section 2 to each other, similarly to the first embodiment. That is, τ in FIG. 11 is changed in keeping with a length of the camera cable 5.

A detection signal 9 is inputted to a phase comparing circuit 11. At the phase comparing circuit 11, a phase of the detection signal 9 and a phase of a signal in which a reference clock 13 that is an output from the VCO 14 is divided by a divider 16 are compared with each other during the period of time (a) out of the image signal section period of time selected by the comparing control signal as shown in FIG. 11(F), and the VCO 14 is controlled through an LPF 12 such that the phases are in agreement with each other. As described above, the input basic clock 13 of the timing-pulse generating circuit 21 is coincident with or in agreement with timing of the image pickup signal 3 of the CCD 6.

On the other hand, the image pickup signal 3 is inputted to the CDS circuit 30. The image pickup signal 3 inputted to the CDS circuit 30 is clamped at a field through portion of the image signal, by a clamp pulse (FIG. 11(C)) and sampling pulses (FIG. 11(D)) outputted from the timing pulse generating circuit 21 and, subsequently, an image signal section is sampled. By doing so, it is possible to extract the image pickup signal 3. Moreover, simultaneously, also in the phase regulating signal and the absolute phase detecting section, clamping and sampling are performed at the same timing. Then, the output signal of the CDS circuit 30 is brought to one illustrated in FIG. 11(G). The signal is such that the absolute phase detecting section is outputted with polarity reverse to that of the image signal. The signal outputted with the reverse polarity is separated by a reference reset signal detection circuit 19, and is inputted to the timing pulse generating circuit 21 as a reference reset signal 20 (FIG. 11(H)). Reset operation of the timing pulse generating circuit 21 can be brought to one similar to that of the first embodiment.

Also in a case of the third embodiment, since the reference reset signal 20 indicates delay of phase of the transmitted image pickup signal, the timing pulse generating circuit 21 generates a timing pulse signal the same as the absolute phase of the transmitted image pickup signal of the CCD 6, similarly to the first embodiment.

Figure 12:
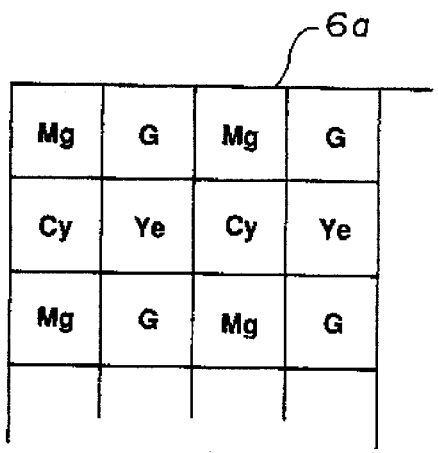

It is assumed that, for example, the CCD 6 has a color filter array (hereinafter referred to as "CFA") 6a arranged as shown in FIG. 12, on a front surface of the image pickup surface. That is, the CFA 6a having a four (4) kinds of filters including Mg, G, Cy and Ye on each of picture elements on the front surface of the CCD 6. In a case of the CFA 6a, two picture elements in a longitudinal direction are synthesized with each other and are read out at the CCD 6. Here, assuming that Mg+Cy is Ca, and G+Ye is Cb, an output from the CCD 6 is such that Ca and Cb are successively outputted as shown in CCDout in FIG. 13(a).

Figure 13:
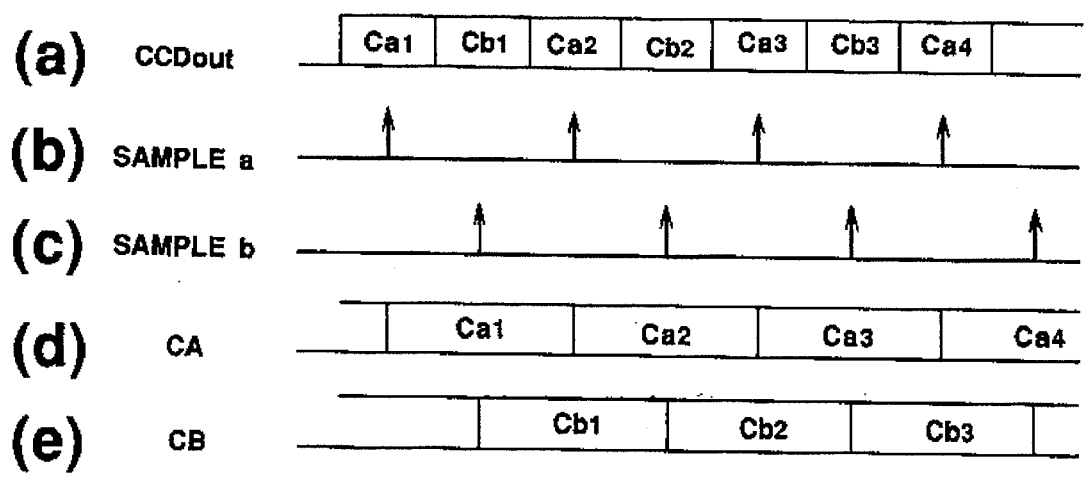

In order to separate the Ca signal and the Cb signal from each other (refer to FIG. 8), the timing pulse generating circuit 21 generates sampling pulses a and b as shown in FIG. 13(b) and 13(c). The CDS 30 holds in sample Ca and Cb at timing of the sample pulses a and b and separates Ca and Cb to CA and CB illustrated in FIG. 13(d) and 13(e).

Here, since the image pickup element drive circuit 8' and the CDS 30, and the CCD 6 are separated from each other or spaced from each other, delay occurs in the drive signal and the image pickup signal transmitted to the CDS 30. Accordingly, if the sample pulses a and b are generated with a signal generated at the image pickup element drive circuit 8 serving as a reference, sample holding cannot be performed at adequate timing. However, in the present embodiment, a discrimination signal is superimposed upon the drive signal. The discriminating signal is separated from the image pickup signal transmitted from the CCD, on the basis of the drive signal, and the sampling pulses a and b are generated with the separated discriminating signal serving as a reference.

Figure 14:
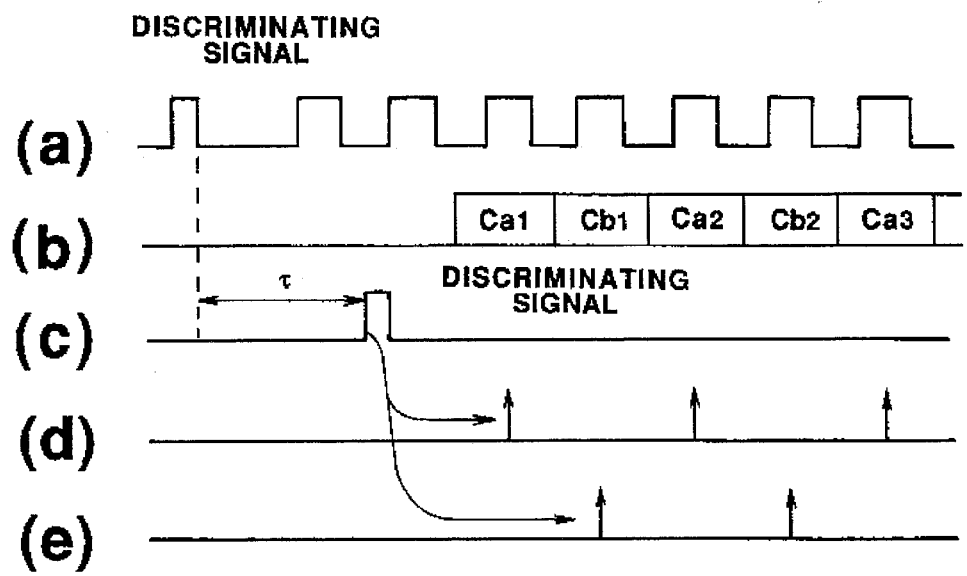

Operation will be described by the use of FIG. 14. The drive signal including the discriminating signal as shown in FIG. 14(a) is sent from the drive signal generating circuit 8' to the CCD 6. From the CCD 6, the discriminating signal is transmitted together with the image pickup signal. The signal from the CCD 6 is such that both the discriminating signal and the image pickup signal are delayed only by τ (FIG. 14(b) and 14(c)).

The discriminating signal (FIG. 14(c)) is separated from the signal. The sampling signal is generated with a phase of the discriminating signal serving as a reference (FIG. 14(d) and FIG. 14(e)).

Thus, since the image pickup signal and the discriminating signal are delayed by the same amount or quantity even if the cable length is changed, the timing pulse is generated with the discriminating signal serving as a reference, whereby sampling can be performed at always adequate timing so that there can be produced the image pickup signal.

Figure 15:
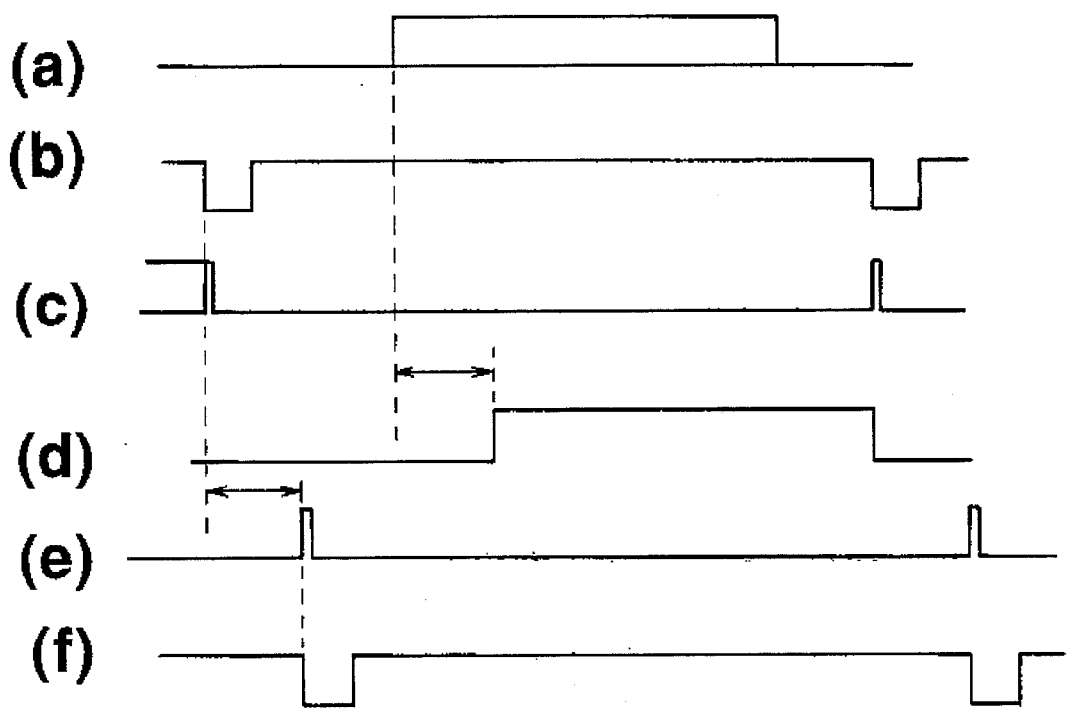

In connection with the above, an another example of generation of the timing pulse by the discriminating signal will be described here. In a case where the CCD 6 and the CDS 30 are not spaced from each other, it is assumed that the image pickup signal is outputted at timing illustrated in FIG. 15(a) with respect to the synchronizing signal illustrated in FIG 15(b). However, in a case where the CCD 6 and the CDS 30 are spaced from each other, timing of the image pickup signal inputted to the CDS 30 generates only delay only by time τ as shown in FIG. 15(d) by delay due to the cable for transmitting the drive signal and the image pickup signal. When processing is performed at timing of the synchronizing signal (FIG. 15(b)) whose base is the delay, the image plane moves or processing of an adequate portion on the image cannot be performed. In view of this, the discriminating signal (FIG. 15(c)) is superimposed upon the CCD drive signal, and the superimposed signal is outputted, to separate (FIG. 15(e)) the discriminating signal transmitted together with the image pickup signal, from the CCD 6. A new synchronizing signal (FIG. 15(f)) is generated with the separated discriminating signal serving as a reference. The image pickup signal is processed at the timing of the synchronizing signal, whereby processing at the adequate timing is made possible.

Functional advantages of the third embodiment are similar to those of the first embodiment. In this connection, as will be seen from the above description, in a case of the third embodiment, a gate signal is not required similarly to the second embodiment. However, in a case of the third embodiment, due to only the fact that a reference reset signal 20 passes through the CDS circuit 30, there can be produced a reference reset signal having an optional width at reverse polarity with respect to the image pickup signal, and separation is also easy. Also here, it has been described that reset operation is an H-rate. However, the arrangement may be such that a portion brought to the absolute phase detecting section is a V-rate, a reference reset signal is generated at a V-cycle, and resetting is made by the V-rate. Further, in the present embodiment, it has been described that the phase regulating signal, the reset signal during the period of image signal, and an trailing edge of the absolute phase detecting section are in agreement with each other. However, the arrangement may be such that the absolute-phase detecting section outputs a pulse to the CCD 6 with a phase so as to be brought to reverse polarity with respect to other periods of time, by the CDS circuit 30.

Figure 16:
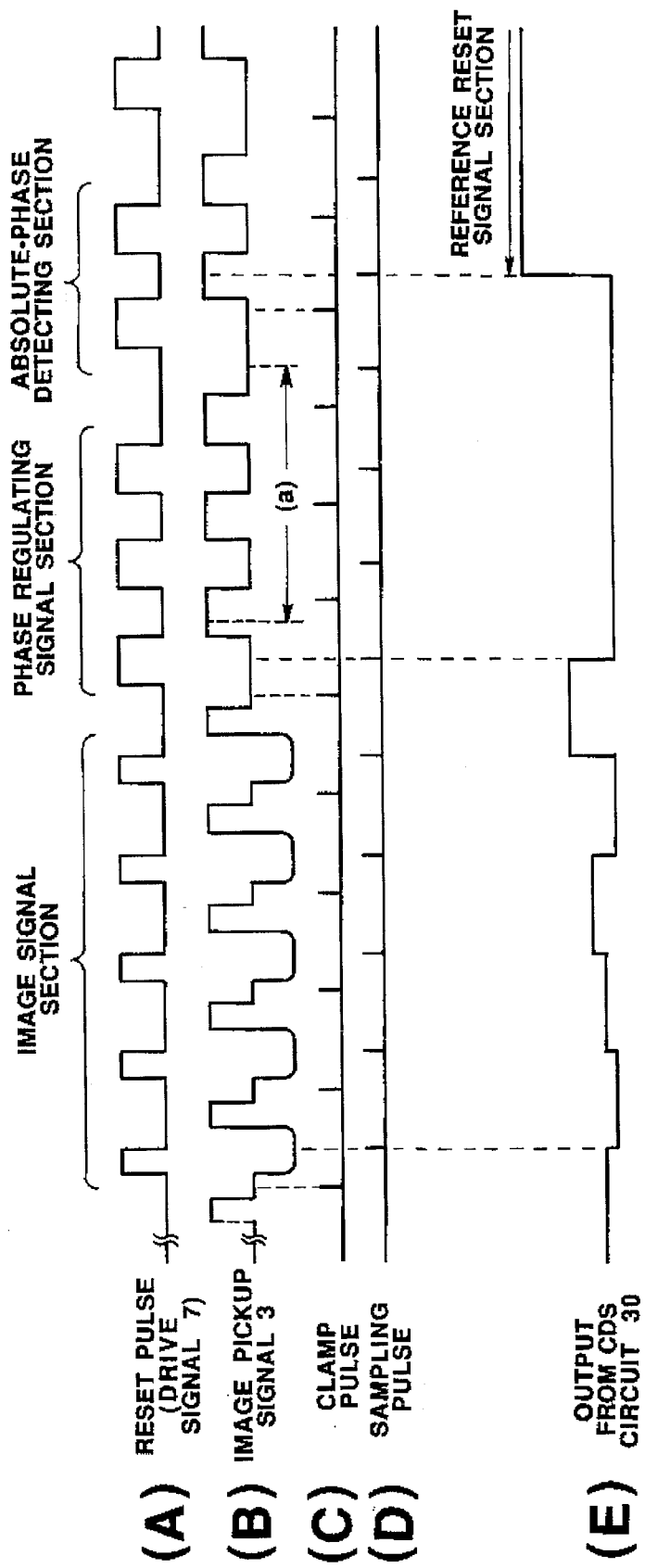

A case will be considered where the reset pulse is outputted at a phase illustrated in FIG. 16(A), for example. In this case, a phase regulating signal and an absolute phase detecting section are reverse in phase to each other. Here, the image pickup signal 3 transmitted from the CCD 1 is brought to one illustrated in FIG. 16(B). By this image pickup signal 3, phase regulation of the VCO 14 is performed only by a portion (a portion indicated by (a) in FIG. 16(B)) of the phase regulating signal, and a clock for the timing-pulse generating circuit 21 is generated. On the other hand, the image pickup signal 3 transmitted from the CCD 6 is brought to one shown in FIG. 16(E) with the clamp pulse (FIG. 16(C)) and the sampling pulse (FIG. 16(D)) by the CDS circuit 30. Also in this case, the reference reset signal is outputted as reverse polarity with respect to other periods of time, by the absolute phase detecting section, similarly to the third embodiment. The reference reset signal 20 is detected, and is inputted to the timing pulse generating circuit 21. In this manner, if the pulse whose duty ratio is 50% is used, the third embodiment becomes strong with respect also to strain of the signal due to transmission.

Figure 17:
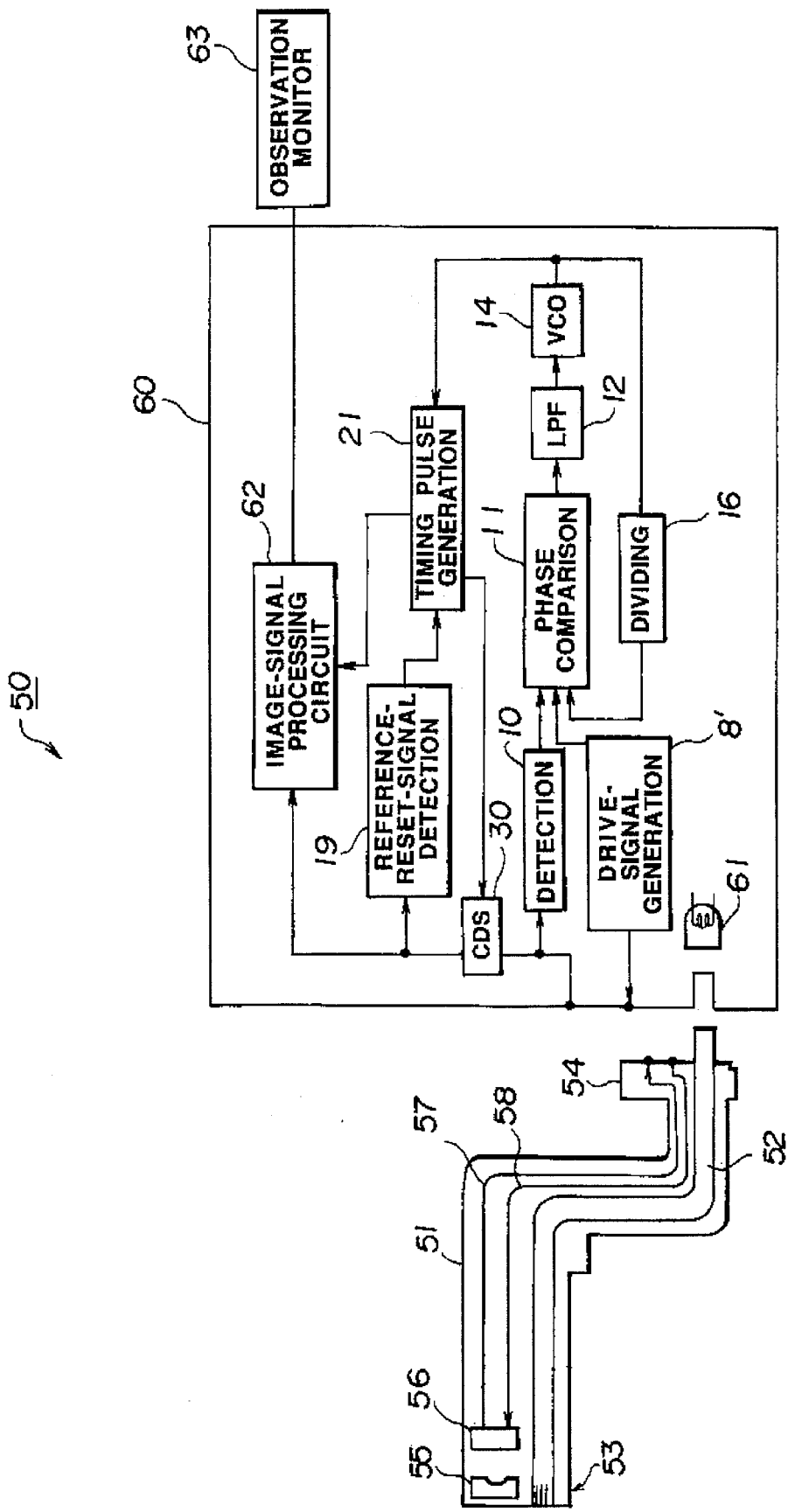

FIG. 17 shows an example in which the third embodiment is applied to the electronic endoscope apparatus 50.

As shown in FIG. 17, a light guide 52 for transmitting illumination light is inserted into an electronic endoscope 51. The light guide 52 has a forward end surface thereof which is arranged at a forward end section 53 so that illumination light can be outgone from the forward end section 53. Further, the light guide 52 has a side thereof adjacent to the incident end, which is connected to a connector 54. Moreover, the forward end section 53 is provided with an objective lens system 55. A solid-state image pickup element 56 is arranged at an imaging position of the objective lens system 55. The solid-state image pickup element 56 has sensitivity within a broad wavelength band or range from an ultraviolet range or area to an infrared range, including also a visible range. A pair of signal lines 57 and 58 are connected to the solid-state image pickup element 56. These signal lines 57 and 58 are inserted into the electronic endoscope 51 and are connected to the connector 54.

On the other hand, a lamp 61 for emitting light of wide band from ultraviolet light to infrared light is arranged within a video processor 60. As this lamp 61, a general xenon lamp, a stroboscopic lamp or the like can be used. The xenon lamp and the stroboscopic lamp emit a large amount of not only visible light, but also ultraviolet light and infrared light. Light emitted from the lamp 61 is incident upon an incident end of the light guide 52. The light is guided to the forward end section 53 through the light guide 52. The light is outgone from the forward end section 53 to illuminate an observing portion.

Return light from the observing portion due to the illuminating light is imaged onto the solid-state image pickup element 56 by the objective lens system 55, and is photoelectrically transferred. Drive pulses from a drive-signal generating circuit 62 within the video processor 61 are applied to the solid-state image pickup element 56 through the signal line 58. Readout and transmission are performed by the drive pulses. An image signal read out from the solid-state image pickup element 56 is inputted into the video processor 60 through the signal line 57 and through the connector 54.

Reset pulses similar to those of the third embodiment are generated from the drive-signal generating circuit 62. At this time, the phase regulating signal the same as that of the third embodiment is superimposed upon the image signal transmitted by the solid-state image pickup element 56 and inputted into the video processor 60. The signal is used so that various kinds of timing pulses are generated in agreement in timing with the inputted image signal of the video processor 60 by a timing-pulse generating circuit 21 similarly to that in the third embodiment of the invention. Predetermined signal processing is applied to an output image signal of a CDS circuit 30 by the image signal processing circuit 62. The output image signal of the CDS circuit 30 is outputted, and is observed by an observation monitor 63 as image information.

In a case of the electronic endoscope apparatus 50, various kinds of electronic endoscopes 51 are used depending upon the observing parts. Accordingly, the signal lines 57 and 58 within the electronic endoscope 51 have various kinds of lengths, depending upon the kinds thereof.

Since, in the electronic endoscope apparatus 50 which employs the third embodiment of the invention, timing pulses of an always adequate or optimum phase can be generated not depending upon the lengths of the signal lines, the third embodiment of the invention is applied to the electronic endoscope apparatus in this manner, whereby even if various kinds of electronic endoscopes are used, it is made possible to perform signal processing at adequate timing automatically.

Further, application to the electronic endoscope apparatus is possible not only in the third embodiment, but also similarly in the first embodiment and the second embodiment.

In connection with the above, the applied example is such that, although the light emitted from the lamp 61 is incident upon the light guide 52 as it is, a rotary filter is inserted into a location between the lamp 61 and the light guide 52 as is in an electronic endoscope apparatus of surface successive type.

Figure 18:
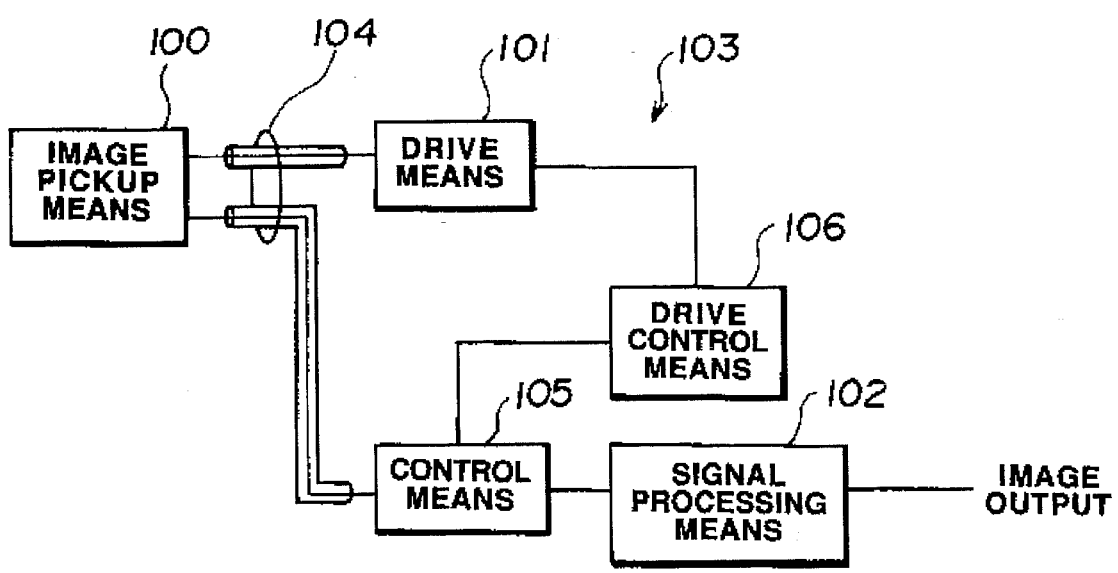
FIGS. 18 to 22 relate to a fourth embodiment of the invention, FIG. 18 representing an arrangement view showing a conceptional arrangement of an image pickup device, FIG. 19 representing a block diagram showing an arrangement of the image pickup device, FIG. 20 representing a circuit view showing an arrangement of a power-source ON detecting circuit, FIG. 21 representing a circuit view showing an arrangement of a timer circuit, and FIG. 22 representing a timing chart for explanation of timing of various signals.

A fourth embodiment of the invention will next be described. First, a conceptional arrangement of the fourth embodiment will be described. As shown in FIG. 18, an image pickup device according to the present embodiment is provided with image pickup means 100 having a solid-state image pickup element for receiving an optical image to convert light information to an electric signal, image processing means 103 having drive means 101 for generating a drive signal for driving the solid-state image pickup element and signal processing means 102 for processing the image pickup signal from the solid-state image pickup element to output an image signal, and signal transmitting means 104 having a first signal line connected to a location between the image pickup means 100 and the image processing means 103 for transmitting the drive signal from the image processing means 103 to the image pickup means 100 and a second signal line for transmitting the image pickup signal from the image pickup means 100 to the image processing means 103. The image processing means 103 is provided with control means 105 for detecting length of the signal transmitting means 104 to control the signal processing means 102 by this detecting signal, and drive control means 106 for monitoring the control means 105 to control the drive means 101 in accordance with a control condition of the control means.

Figure 19:
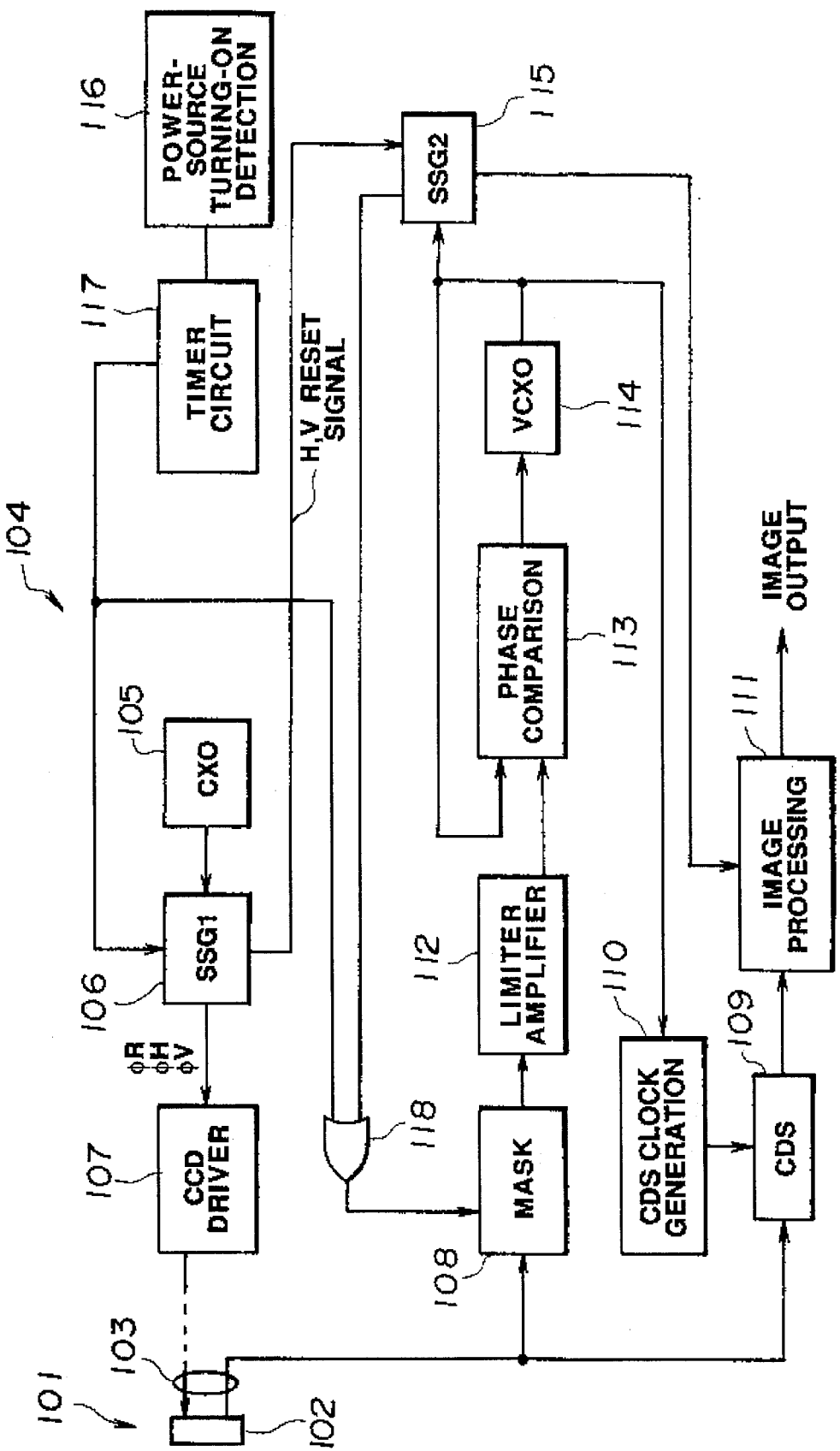

As shown in FIG. 19, a specific or exemplified arrangement is such that a vertical drive signal φV, a horizontal drive signal φH and a reset signal φR are supplied to a CCD 102 arranged within a camera section 101 serving as image pickup means, through a cable 103 which serves as signal transmitting means. A video processor 104 serving as image processing means is provided with an SSG1 (106) for generating the vertical drive signal φV, the horizontal drive signal φH and the reset signal φR that are drive pulses for driving the CCD 102 by outputting from a CXO 105 so that the vertical drive signal φV, the horizontal drive signal φH and the reset signal φR are supplied to the cable 103 through a CCD driver 107. In this connection, the CCD driver 107 is arranged similarly to the drive-signal generating circuit 8' in the third embodiment.

On the other hand, the image pickup signal from the CCD 102 is transmitted to a mask circuit 108 and a CDS circuit 109 within the video processor 104, through the cable 103. At the CDS circuit 109, an image pickup signal of the CCD 102 is performed in correlation double sampling by sampling pulses from a CDS clock generating circuit 110 to output an image signal by an image processing circuit 111.

Figure 36:
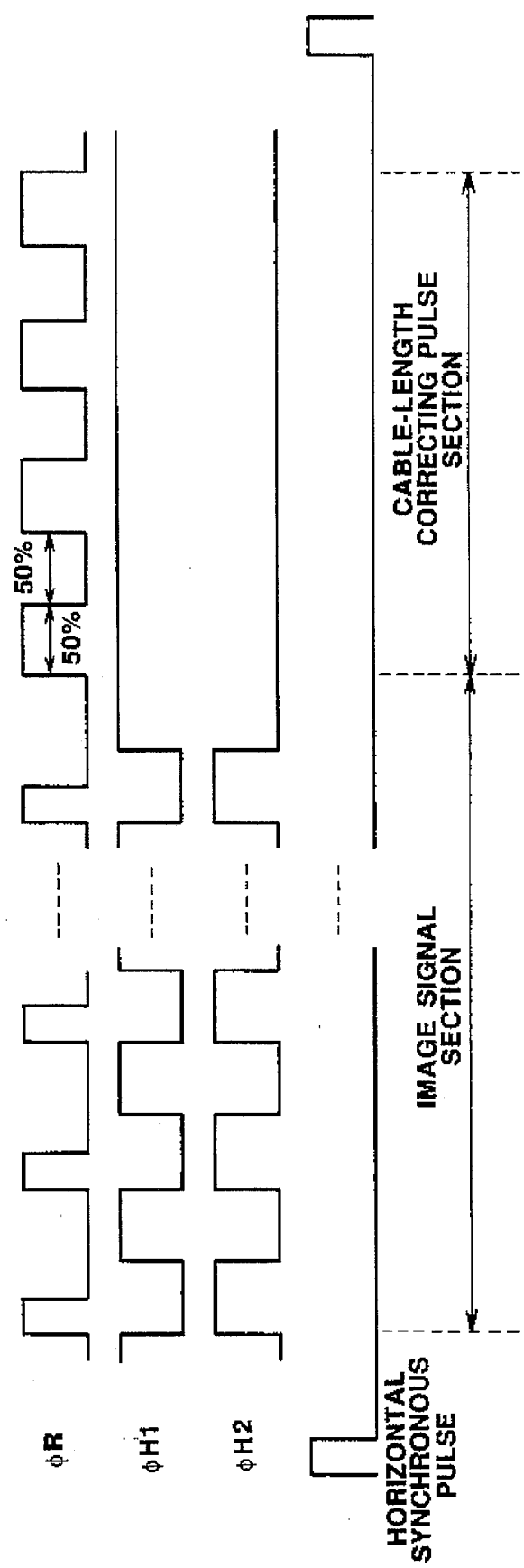
Figure 37:
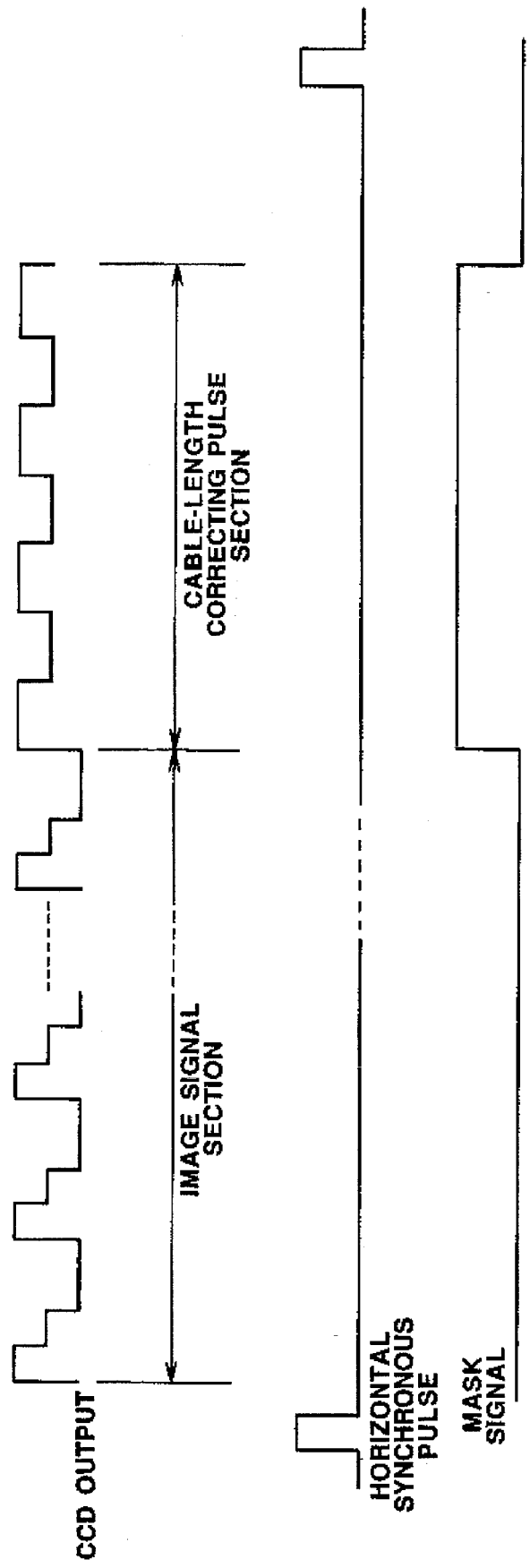
Figure 38:
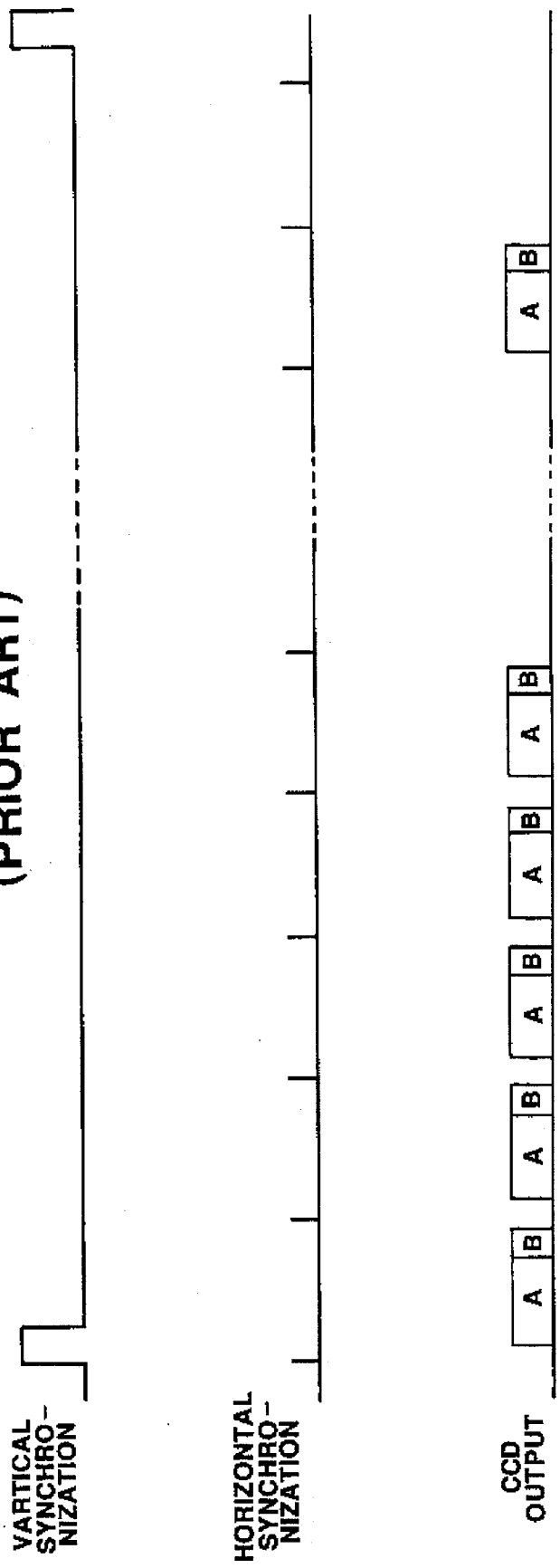

Similarly to the detection circuit 10 in the third embodiment of the invention, the mask circuit 108 erases a signal during an effective image period of time of the image pickup signals of the CCD 102 (hereinafter referred to as "image signal section") to extract signals during an invalid image period of time and signals during a PLL lock-off period of time (hereinafter referred to as "cable-length correction pulse section") such as a retrace-line blanking period of time, an index display period of time or the like, for example in the endoscope television camera system. In this connection, similarly to the above-described conventional example, as shown in FIG. 36, the image signal section is a signal which is produced by driving the CCD 102 by the CCD drive pulses of φR, φH and φV. The cable-length correction pulse portion is a signal which is produced by driving only by φR of 50% of duty. Accordingly, a cable correction pulse section includes φR of 50% of duty. The mask circuit 108 extracts the φR.

φR extracted by the mask circuit 108 is shaped in waveform by a limiter amplifier circuit 112, and is supplied to one of a pair of inputs of a phase comparing circuit 113. Output pulses of a VCXO 114 are inputted to the other input of the phase comparing circuit 113. The phase comparing circuit 113 outputs a phase difference between φR and the output pulse from the VCXO 114, that is, a direct-current component signal in accordance with information corresponding to the length of the cable 103 to the VCXO 114, to thereby arrange and control the PLL so as to combine the phase of the output pulse of the VCXO 114 and the phase of φR with each other.

The output pulse of the VCXO 114 is supplied to the CDS clock generating circuit 110. The CDS clock generating circuit 110 generates a CDS clock on the basis of the output pulse. The CDS circuit 109 performs correlation double sampling of the image pickup signal of the CCD 102 to produce or obtain an image signal of base band.

On the other hand, the SSG2 (115) generates timing pulses for the image signal, on the basis of the output pulses of the VCXO 114 and the H and V reset signals from the SSG1 (106). The image processing circuit 111 processes in signal the output from the CDS 109 on the basis of the timing pulses, to output the signal-processed output as an ordinary or usual image signal.

Furthermore, the video processor 104 is provided therein with a power-source ON detecting circuit 116 for detecting a ON-condition or ON-state of a power source for the apparatus, and a timer circuit 117 in which, when the power source is turned ON, a detecting signal is generated by the power-source ON detecting circuit 116, and a control signal which is brought to an H-level during a predetermined period of time T on the basis of the detecting signal is generated. The control signal controls the SSG1 (106), and supplies only the reset signal φR to the CCD driver 107. OR with respect to the output from the SSG2 (115) is taken by an OR circuit 118. The mask circuit 8 is controlled by the output from the OR circuit 118. Thus, the reset signal φR of the cable-length correction pulse section is extracted.

Figure 20:
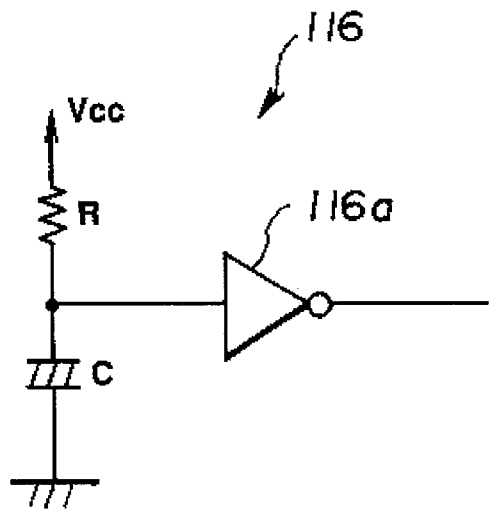

As shown in FIG. 20, the power-source ON detecting circuit 116 creates a signal rising later than turning-ON of the power source by C and R. The signal is inverted by an inverter 116a and is outputted. The output is outputted to the timer circuit 117 as a detecting signal.

Figure 21:
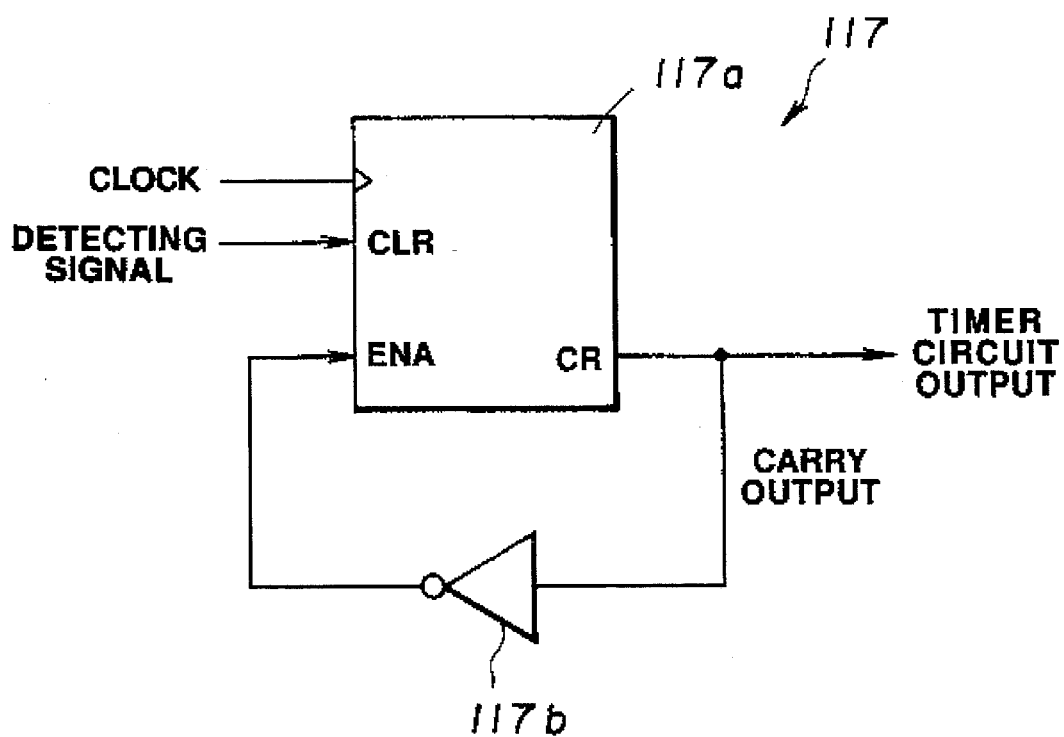

Further, as shown in FIG. 21, the timer circuit 117 comprises an n-bit counter 117a and an inverter 117b. The detecting signal from the power-source ON detecting circuit 116 is inputted to a clear terminal of the n-bit counter 117a. Accordingly, the n-bit counter 117a delays from the turning-ON of the power source to start count operation. Moreover, a carry output of the n-bit counter 117a is inverted by an inverter 117b and is inputted to an enable input terminal. In view of this, the n-bit counter is brought to a counter circuit which stops or halts operation after the n-bit counter has performed count operation for a predetermined period of time from turning-ON of the power source, and the carry output is brought to an output from the timer circuit 117.

Operation from the time of turning-ON of the power source of the image pickup device arranged in this manner will be described.

Figure 22:
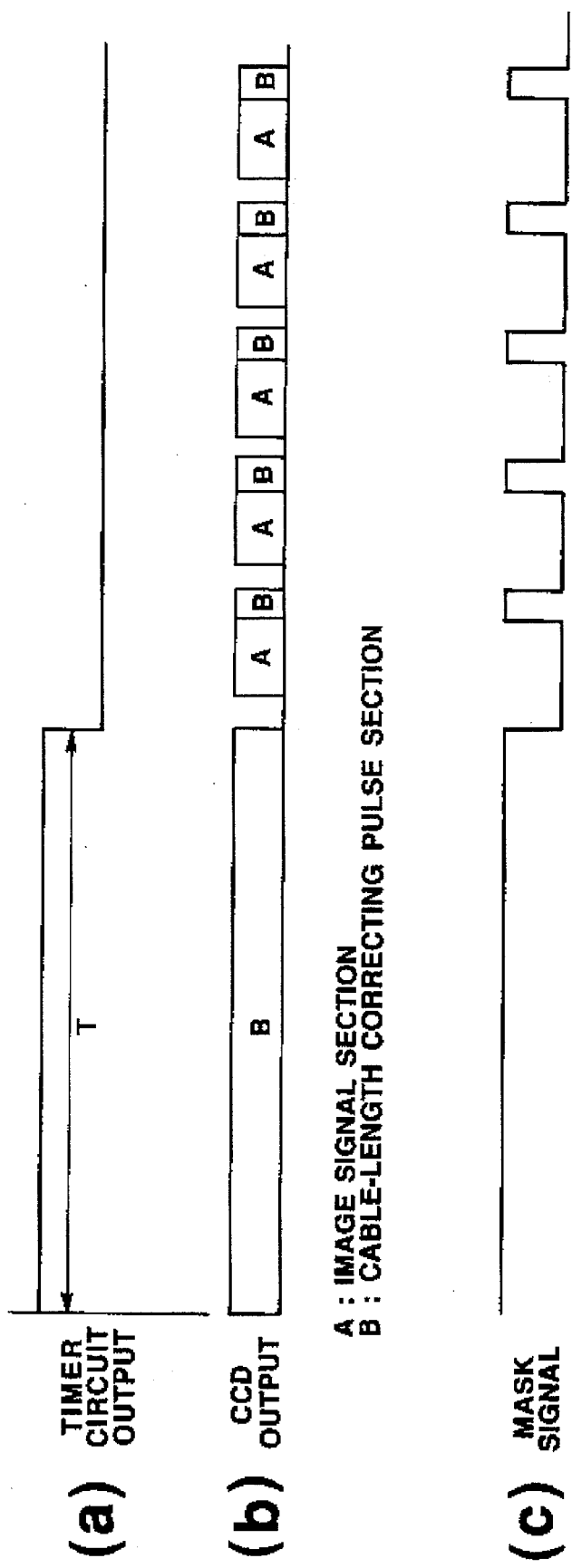

When the power source is turned ON, this is detected by the power-source ON detecting circuit 116. Thus, the detecting signal is generated. As shown in FIG. 22(a), the timer circuit 117 outputs the control signal (the output from the timer circuit 117) of the H-level during the predetermined period of time T, by the detecting signal. The SSG1 (108) receives the control signal and drives the CCD 102 at $\phi R$ of 50% of the duty, similarly to the cable-length correction pulse section (indicated by B in the drawings) shown in FIG. 11 illustrating the prior art, during the period of time T, as shown in FIG. 22(b). Subsequently, the CCD driver 107 is controlled in such a manner that the timer circuit 117 drives the CCD 102 at $\phi R$, $\phi H$ and $\phi V$ (indicated by A in the drawings).

Furthermore, since the mask circuit 108 is controlled by the OR output between the control signal and the mask signal from the SSG2 (115), the mask circuit 108 is brought to active during the period of time T, as shown in FIG. 22(c). The subsequent operation is similar to that illustrated in FIG. 36 showing the prior art.

Accordingly, the image pickup device according to the fourth embodiment corrects a propagation delay time error due to the cable length, to perform signal processing. The image pickup device according to the fourth embodiment continuously transmits and drives the cable-length correction pulse to the CCD during the predetermined period of time T from time of turning-ON of the power source in which the PLL lock is off. The image pickup device according to the fourth embodiment detects the cable-length correction pulse by the image pickup signal during this period of time T. Accordingly, it is possible to be drawn into a PLL lock condition by a simple arrangement for a short period of time.

A fifth embodiment of the invention will next be described.

Since the fifth embodiment is substantially the same as the fourth embodiment, only different arrangements will be described. The same or identical reference numerals are applied to the same or identical components and parts, and the description thereof will be omitted.

Figure 23:
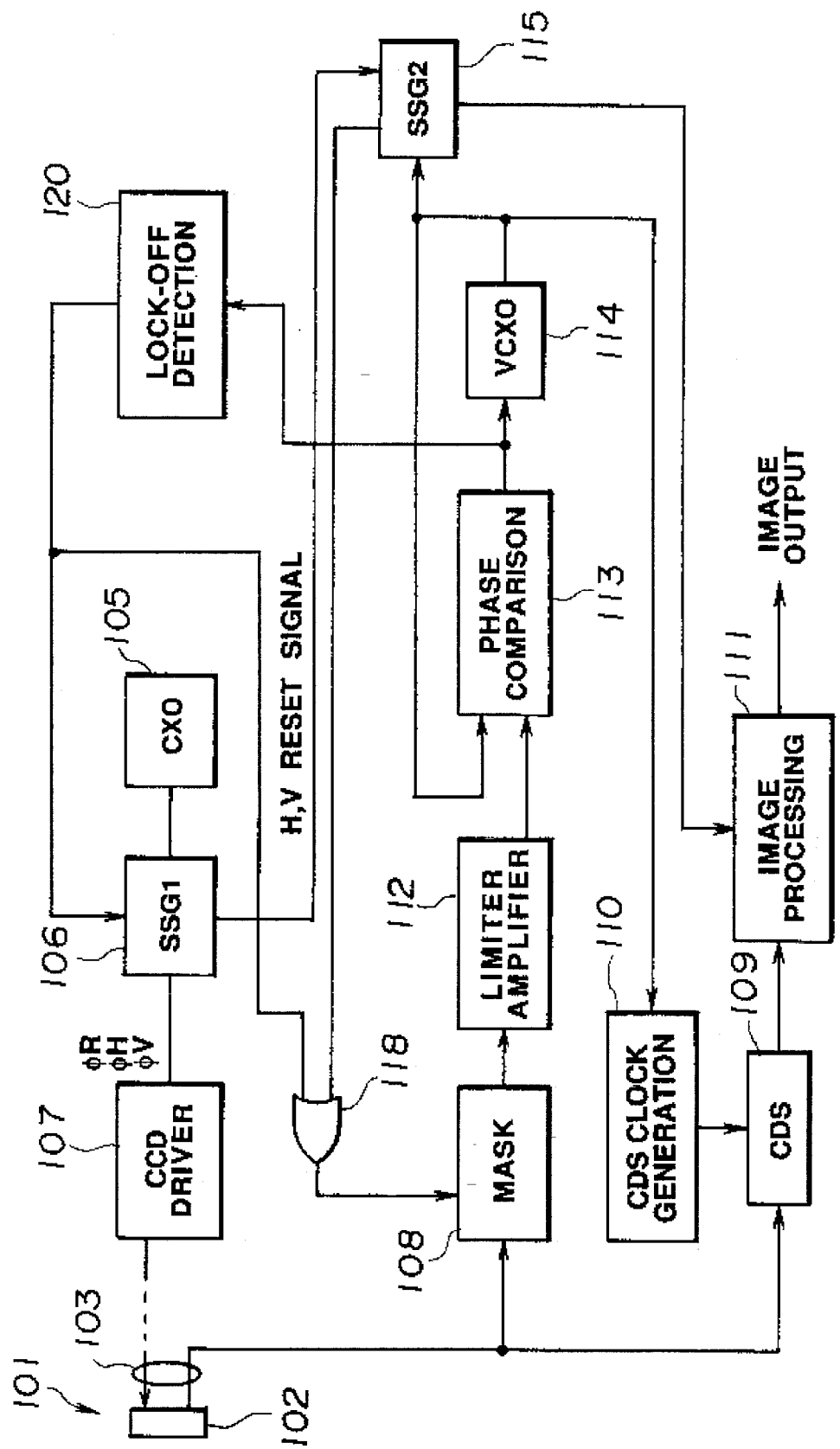

As shown in FIG. 23, an image pickup device according to the fifth embodiment is so arranged as to be provided with a lock-off detecting circuit 120 for detecting that output voltage of the phase comparing circuit exceeds a predetermined upper limit value or is less than a lower limit value, to generate a control signal, in place of the timer circuit 117 in the fourth embodiment.

Figure 24:
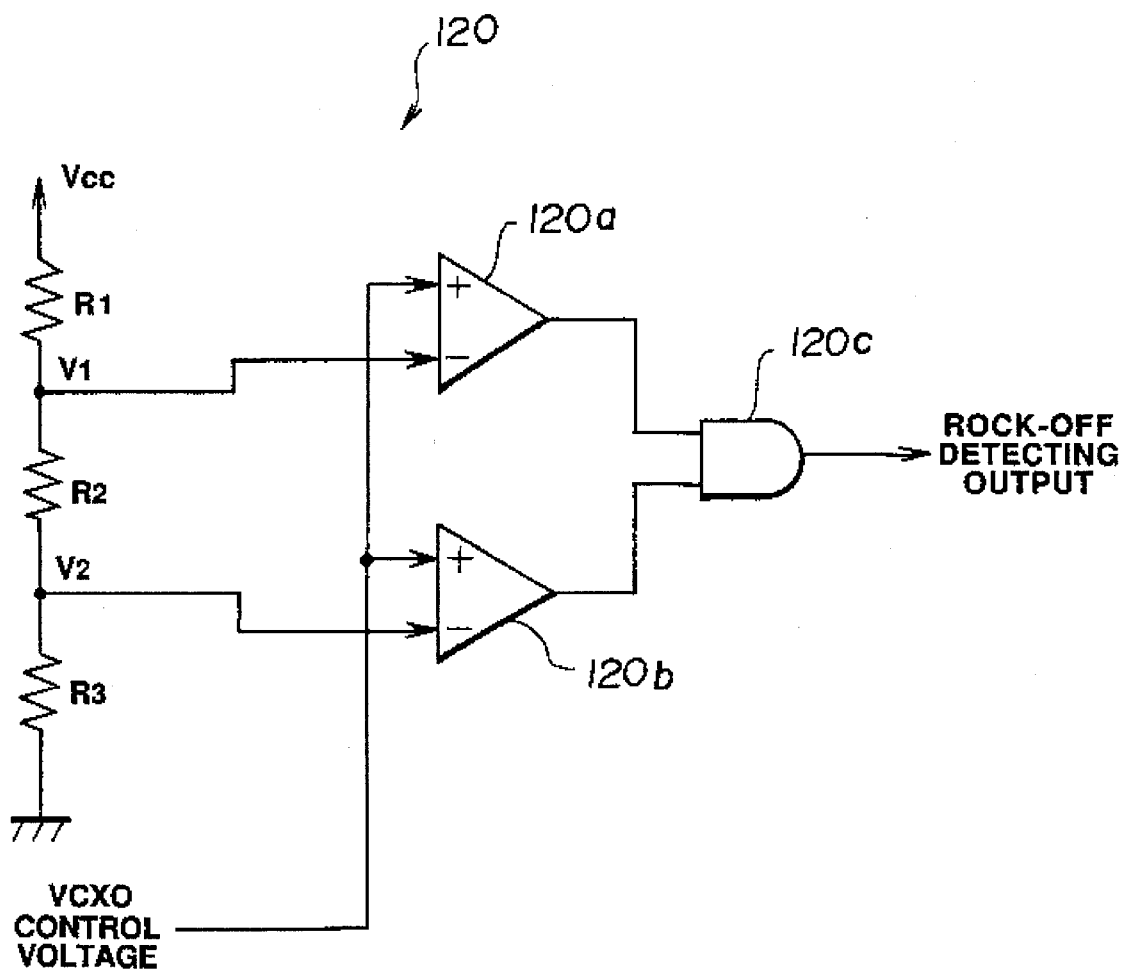

As shown in FIG. 24, the lock-off detecting circuit 120 divides power-source voltage by R1, R2 and R3 to create V1 and V2, and detects, by a pair of comparators 120a and 120b and an AND 120c, that VCXO control voltage from a phase comparator 13 is brought to one between VI–V2.

Other arrangements are the same as those of the fourth embodiment.

As shown in FIG. 25, in the image pickup device according to the fifth embodiment, arranged as described above, the lock-off detecting circuit 120 detects that the output voltage of the phase comparing circuit exceeds the predetermined upper limit or is less than the lower limit value, to bring the control signal (the lock-off detecting output in FIG. 25(a)) to the H-level, to thereby output the same. Operation due to the control signal is the same as that in the fourth embodiment.

Accordingly, the image pickup device according to the fifth embodiment corrects the propagation delay time error due to the cable length to perform signal processing and detects the PLL lock condition. In a case brought to the lock-off condition, the cable-length correction pulse is continuously transmitted to the CCD to drive the same. Thus, the cable-length correction pulse is detected by the image pickup signal. Accordingly, it is possible to be drawn into a PLL lock condition by a simple arrangement for a short period of time.

A sixth embodiment of the invention will next be described.

The sixth embodiment of the invention is substantially the same as the fourth embodiment, and only different arrangements will be described. The same or identical reference numerals are applied to the same or identical arrangements, and the description thereof will be omitted.

Figure 26:
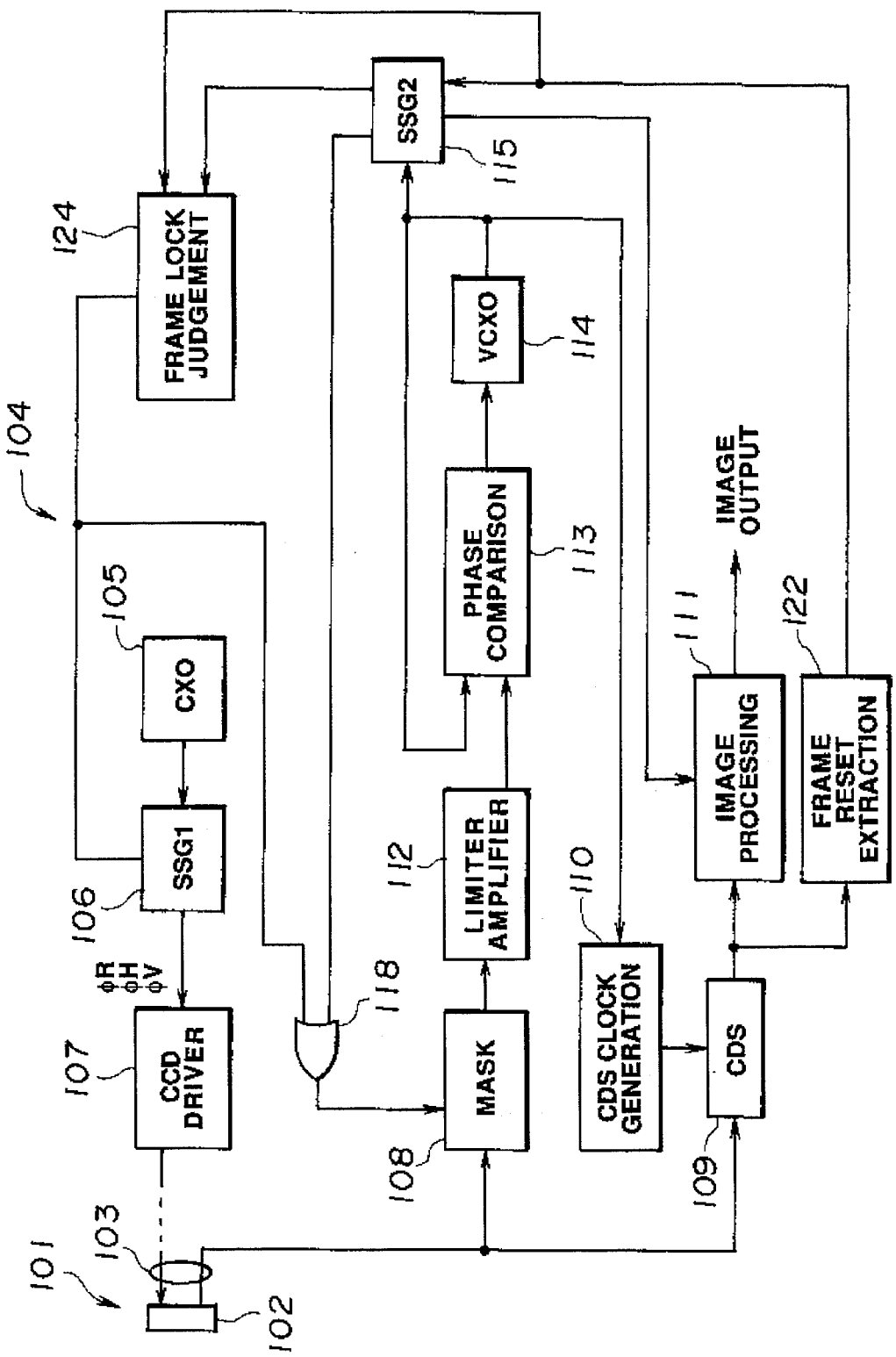

As shown in FIG. 26, the image pickup device according to the sixth embodiment divides a driving period of time of a CCD 102 of one frame into an image signal portion (driven by $\phi R$, $\phi H$ and $\phi V$), a cable-length correction pulse section (driven by $\phi R$ of 50% of duty) and a frame reset section (driven by $\phi R$ that is reverse in phase to $\phi R$) to drive a CCD 102 by an SSG1 (106), differentiated from the fourth embodiment. The image pickup device according to the sixth embodiment is so arranged as to comprise a frame reset extracting circuit 122 for extracting /$\phi R$ of the frame reset section to generate a frame reset pulse, and a frame lock judging circuit 124 for judging a frame lock on the basis of the frame reset pulse of the frame reset extracting circuit 122 to output a control signal to the SSG1 (106), in place of the timer circuit 117 in the fourth embodiment.

Figure 27:
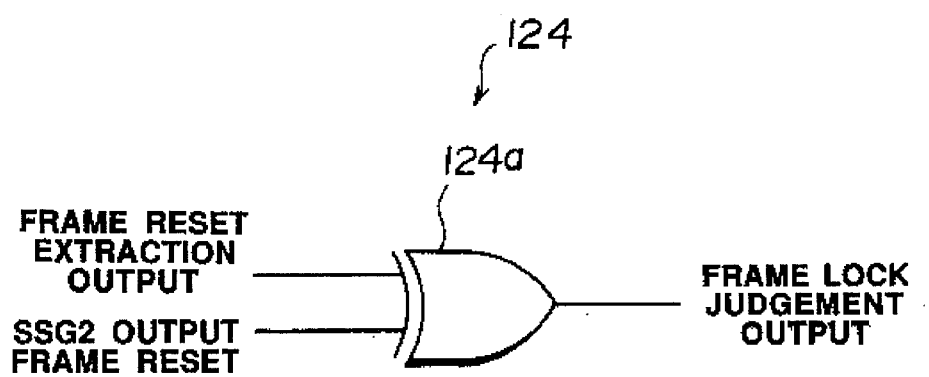

As shown in FIG. 27, the frame lock judging circuit 124 detects agreement between the output from the frame reset extracting circuit 122 and the frame reset signal generated within the SSG2 (115) by an exclusive OR (logical sum) (EX OR) 124a, to output a judgment output.

Other arrangements are the same as those of the fifth embodiment.

In the image pickup device according to the sixth embodiment, arranged as described above, as shown in FIG. 28, the image pickup signal from the CCD 102 is sampled by a CDS clock corrected in cable length by the method illustrated in the fifth embodiment, to thereby produce or obtain a CDS output. A frame reset section is extracted at the frame reset extracting circuit 122 by the CDS output, to produce a frame reset pulse as shown in FIG. 24. The SSG2 (115) is reset by the frame reset pulse, whereby the SSG1 (106) and the SSG2 (115) are synthesized with each other.

On the other hand, the SSG2 (115) divides the output from a VCXO 114 by an interior counter (not shown), to thereby create an interior frame reset pulse which is equivalent to the frame reset pulse. The frame lock judgment circuit 124 compares the interior frame reset pulse created within the SSG2 (115) and the frame reset pulse extracted from the CDS output with each other, to judge consistency and inconsistency. In case of inconsistency, the control signal of the H-level is outputted to the SSG1 (106). The SSG1 (106) is so controlled as to be brought to a CCD output as shown in FIG. 25, by the control signal. Other functions are the same as those of the fourth embodiment.

In this manner, in the image pickup device according to the sixth embodiment, the propagation delay time error due to the cable length is corrected to execute or perform signal processing, and the frame reset section is provided to thereby judge the frame lock, so that the CCD output for the frame lock as shown in FIG. 29 is outputted. Accordingly, it is possible to perform operation synchronizing the frame, and the PLL lock condition within a single frame is judged by the frame lock judging circuit 124. In a case where the PLL lock is off, the cable-length correction pulse is continuously transmitted to the CCD to drive the same. The cable-length correction pulse is detected by the image pickup signal. Thus, it is possible to be drawn into a PLL lock condition by a simple arrangement for a short period of time.

A seventh embodiment of the invention will next be described.

The seventh embodiment is substantially the same in fundamental or basic arrangement as the fourth to sixth embodiments. However, the present embodiment is characterized in that a CCD is driven at φR of a duty ratio of 50% during a period of time until peak-value correction of a CCD drive signal waveform due to the cable length is completed or finished.

Figure 30:
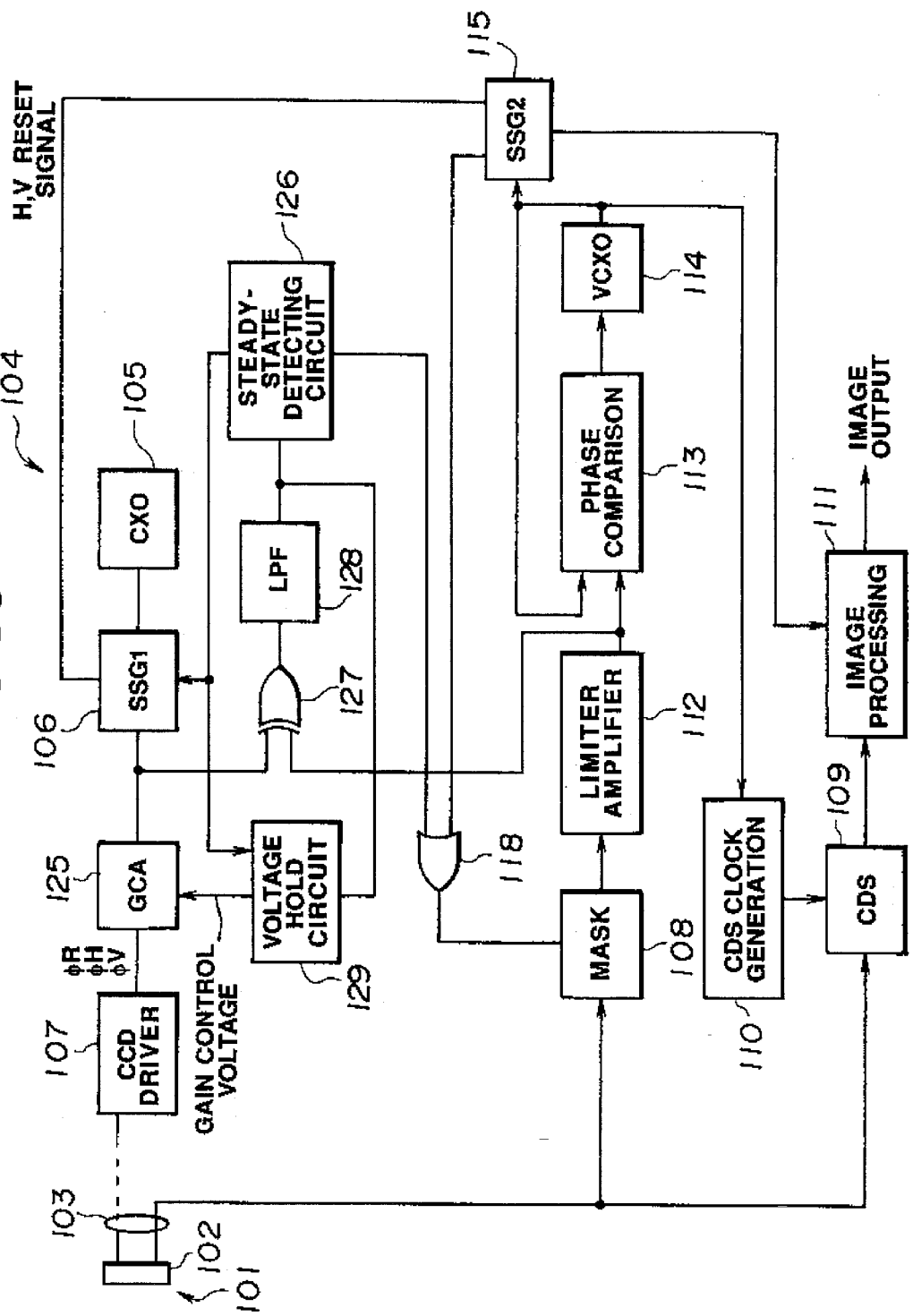
FIGS. 30 to 34 relate to a seventh embodiment of the invention, FIG. 30 representing a block diagram showing an arrangement of an image pickup device, FIG. 31 being a circuit view showing an arrangement of a steady-state detecting circuit, FIG. 32 representing a circuit view showing an arrangement of a voltage hold circuit, FIG. 33 representing a timing chart for description of timing of each of signals, and FIG. 34 representing an arrangement view showing an arrangement of an electronic endoscope apparautus to which the image pickup device is applied.

As shown in FIG. 30, a vertical drive signal φV, a horizontal drive signal φH and a reset signal φR are supplied to a CCD 102 arranged within a camera section 101 serving as image pickup means, through a cable 103 serving as signal transmitting means. An SSG1 (106) for generating the vertical drive signal φV, the horizontal drive signal φH and the reset signal φR that are the drive pulses for driving the CCD 102 by an output from a CXO 105 is provided on a video processor 104 serving as image processing means. The vertical drive signal φV, the horizontal drive signal φH and the reset signal φR are supplied to the cable 103 through a GCA 125 and a CCD driver 107.

On the other hand, the SSG2 (115) generates a timing pulse for the image signal on the basis of the output pulse of a VCXO 114 and the H and V reset signals from the SSG1 (106). By the timing pulse, a image signal processing circuit 111 processes in signal an output from the CDS 109, to output the same as an ordinary or usual image signal.

Further, an EX-OR circuit 127 for outputting, as a pulse width, a phase difference between φR of the duty ratio of 50% produced by the SSG1 (106) and φR of the duty ratio of 50% shaped in waveform by a limiter amplifier circuit 112 is provided within the video processor 104. An output expressing the phase is converted to a direct-current voltage value corresponding to the length of the cable 103 by an LPF 128. The direct-current voltage output passes through a voltage hold circuit 129 as to be brought to gain control voltage of the GCA 125, to perform regulation of peak values of the φR, φH and φV in accordance with the cable length.

Furthermore, the output from the LPF 128 is supplied also to a steady-state detecting circuit 126. The steady-state detecting circuit 126 outputs a control signal of the H-level during a period of time until a direct-current voltage value corresponding to the length of the cable 103 is brought to a steady state. After the steady state has once been detected, the steady-state detecting circuit 126 continues to output the L-level. The control signal controls the SSG1 (106), and supplies only the reset signal φR to the GCA 125. OR is taken with respect to the output from the SSG2 (115) by an OR circuit 118. By an output from the OR circuit 118, a mask circuit 108 is controlled so that the reset signal φR of the cable-length correction pulse section is extracted.

Moreover, in the voltage hold circuit 129, when the control signal of the steady-state detecting circuit 126 is the H-level, the output from the LPF 128 is maintained or kept as an output as it is. By the fact that the control signal of the steady-state detecting circuit 126 is changed to the L-level, the voltage hold circuit 129 holds or retains the output from the LPF 128 just before the control signal is changed to the L-level, to continue to supply the control voltage of the gain adjustment or regulation of the GCA 125.

Figure 31:
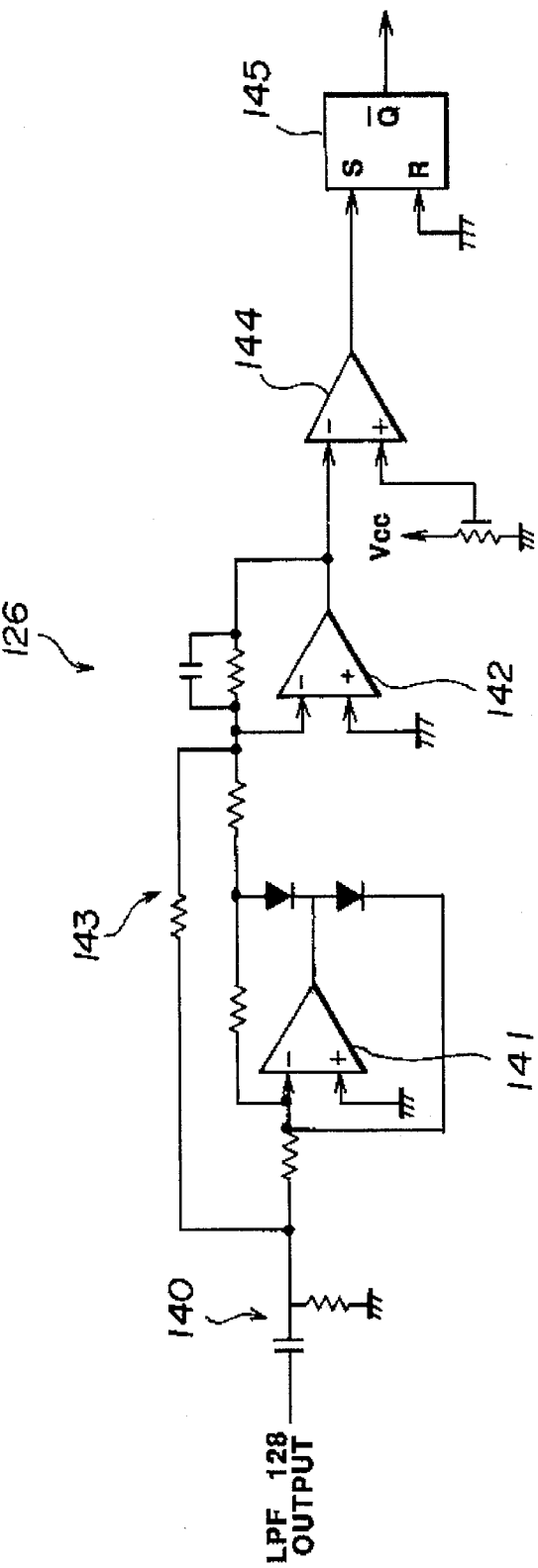

As shown in FIG. 31, at the steady-state detecting circuit 126, the output from the LPF 128 is differentiated by a differential circuit 140, to extract a fluctuated or varied width. An absolute value of the fluctuated width is taken out or fetched by an absolute-value circuit 143 which comprises a pair of operation amplifiers 141 and 142 and the like at the subsequent stage. When an absolute value of the fluctuated width is less than a preset value, the H-level is outputted by a comparator 144. This is brought to a set input of an S-R latch 145. Reversed output/Q is brought to an output from a steady detecting circuit 126. Accordingly, the H-level is outputted until the steady state is once detected. After being detected, the L-level is outputted.

Figure 32:
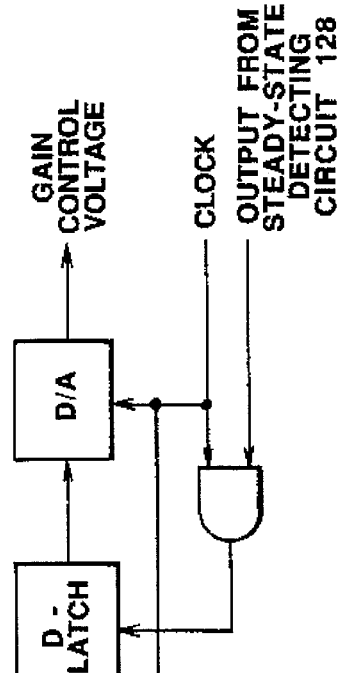

Further, as shown in FIG. 32, in the voltage hold circuit 129, the output from the LPF 128 is A/D converted by an A/D converter 150. The output from the LPF 128 passes through a D-latch 151, and is D/A converted by a D/A converter 152 so as to be brought to gain control voltage of the GCA 125. A clock which uses the A/D converter 150 and the D/A converter 152 is supplied from the CXO 105. Moreover, a clock of the D-latch 151 uses the output from the AND circuit 153 which takes AND between the output from the CXO 105 and the output from the steady-state detecting circuit 126. Thus, until the steady-state is detected, the output from the A/D converter 150 is up-dated by the D-latch 151, and is sent to the D/A converter 152. Once the steady state is detected, the output from the AND circuit 153 is fixed the L-level. The output from the D-latch 151 is held. The output from the D/A converter 152 also continues to hold a predetermined value.

Other arrangements are the same as those of the fourth embodiment.

Operation of the present embodiment arranged in this manner will be described.

Figure 33:
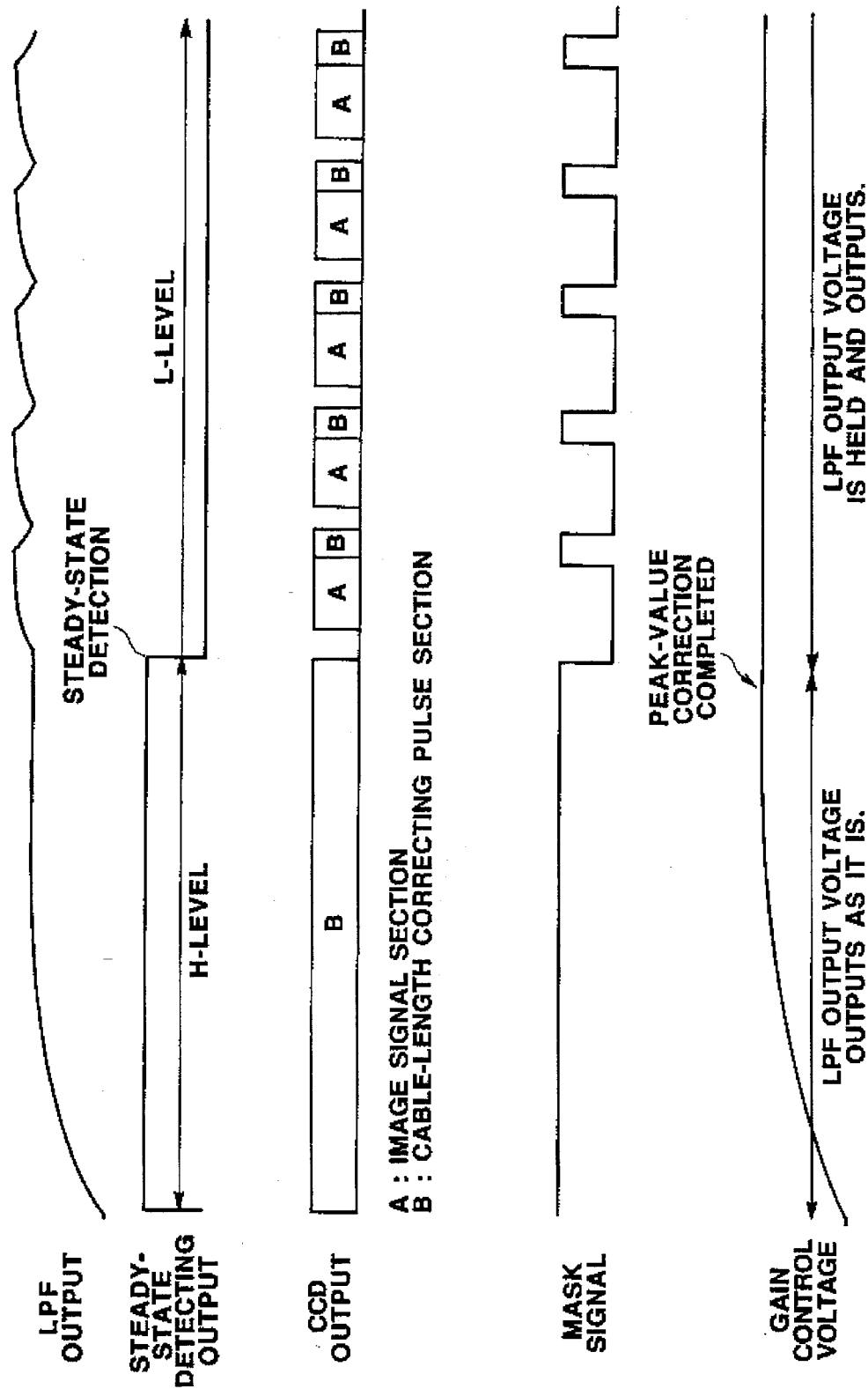

As shown in FIG. 33, when the power source is turned ON, the steady detecting circuit 126 outputs a control signal of the H-level during a period of time until the output from the LPF 128 is brought to a steady state. The SSG1 (106) receives the control signal to drive the CCD 102 only by φR of the duty of 50%. Further, the mask circuit 108 is controlled by the OR output with respect to the control signal and the mask signal from the SSG2 (115). The mask circuit 108 is brought to active during this period of time.

φR which is extracted by the mask signal and which is shaped in waveform by the limiter amplifier 112 is converted to a direct-current value corresponding to the length of the cable 103, through the EX-OR circuit 127 and the LPF 128, together with φR outputted from the SSG1 (106). After the PLL has been locked, the output from the LPF 128 is brought to the steady state. Thereafter, the steady-state detecting circuit 126 continues to output the control signal of the L-level.

The SSG1 (106) receives the control signal, and drives the CCD 102 at φR, φH and φV. Moreover, the voltage hold circuit 129 holds or retains the output from the LPF 128 just before the control voltage is brought to the L-level, and continues to supply the output to the GCA 125. Adequate correction of the peak value of the drive signal is performed.

Accordingly, the separation-type image pickup device according to the present embodiment is arranged such that the propagation delay time error is corrected by the cable length to perform signal processing, and the cable-length correction pulse is continuously transmitted to the CCD 102 to drive the same until the PLL is locked so that correction of the peak value of the drive signal is completed or ended. Accordingly, it is possible to perform or execute correction of the lock of the PLL and the peak value of the drive signal. Moreover, since the correction of the peak value of the drive signal has been completed until the image pickup signal due to the ordinary or usual read-out is outputted by the CCD, an ugly or unsightly image is not displayed on a monitor by transmitting failure due to inadequateness of the peak value and the like.

In the seventh embodiment described above, $\phi R$ of 50% of the duty is used at the cable-length correction pulse section. However, the present invention should not be limited to this specific arrangement. For example, in a case also where, by the fact that a signal such as one in which frequency is lower than the $\phi R$ of 50% of the duty, and a cycle thereof is equal to or more than the delay time is used at the cable-length correction pulse section, the cable length is considerably long, and the delay time is equal to or more than one picture-element cycle, it is possible to effectively detect the delay time.

An example in which each of the fourth to seventh embodiments is applied to the electronic endoscope apparatus will next be described.

Figure 34:
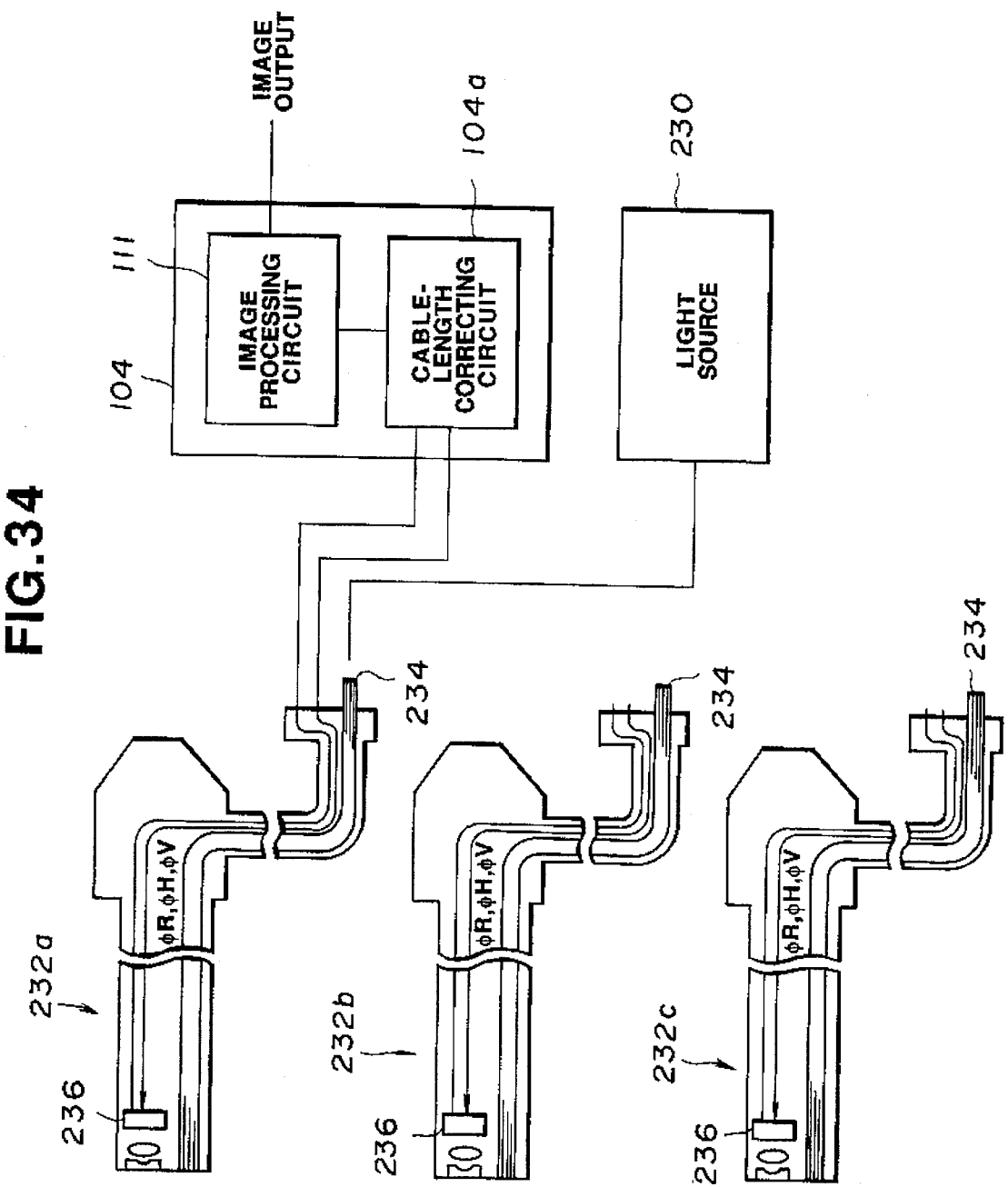
Figure 35:
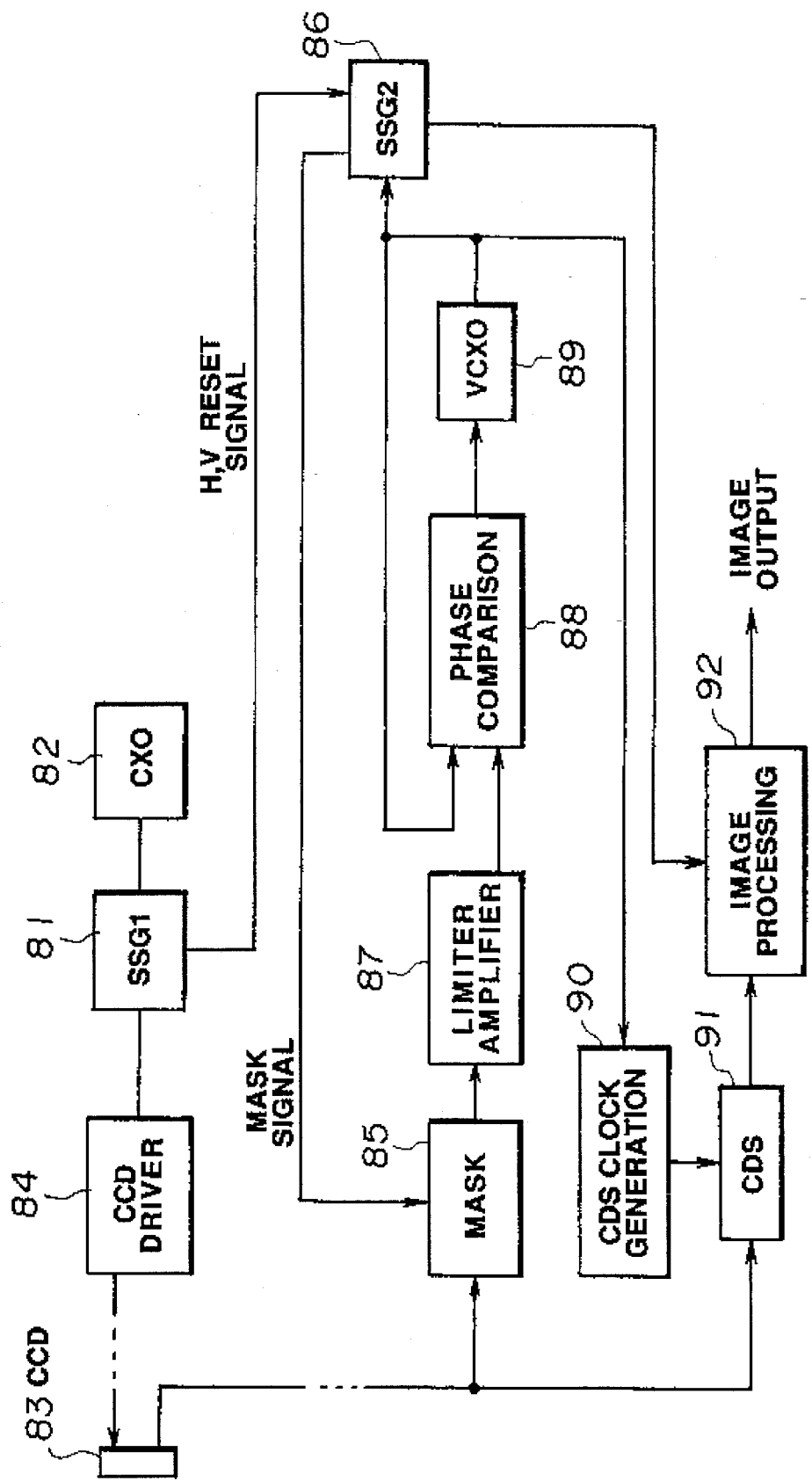
FIGS. 35 to 38 relate to a prior art or conventional example, FIG. 35 representing a block diagram showing an arrangement of an image pickup device, FIG. 36 representing a timing chart for explanation of timing of a drive signal, FIG. 37 representing a first timing chart for explanation of timing of an image pickup signal, and FIG. 38 representing a second timing chart for explanation of timing of the image pickup signal.

As shown in FIG. 34, the electronic endoscope apparatus comprises a plurality of electronic endoscopes, for example, a bronchus electronic endoscope 232a, an upper digestive-organ electronic endoscope 232b, a lower digestive-organ electronic endoscope 282c, and the like, a light source 230 for supplying illuminating light to the electronic endoscopes 232a~232c, and a video processor 104 in any one of the fourth to seventh embodiments, for processing in signal image pickup signals from the respective electronic endoscopes 282a~282c.

For example, the illuminating light supplied from the light source 230 is transmitted to a forward end of the bronchus electronic endoscope 232a, by a light guide 234 arranged within the bronchus electronic endoscope 232a, to illuminate a subject (an observing part). Reflected light from the subject is image-picked up by a CCD 236 in accordance with a drive signal from a cable-length correction circuit 104a within the video processor 104. The image pickup signal performs processing described with reference to each of the fourth to seventh embodiments, at the cable-length correction circuit 104a. The image pickup signal is outputted to an image processing circuit 111, and is processed in signal at the image processing circuit 111 so that the image pickup signal is outputted as an image signal. In this connection, a cable-length correction circuit 104a is arranged by elements except for the image processing circuit 111, in the video processor 104 of each of the fourth to seventh embodiments. Further, although the arrangement has been described by the use of the bronchus electronic endoscope 232a, it is needless to say that the upper digestive-organ electronic endoscope 232b and the lower digestive-organ electronic endoscope 232c are similarly connected to the light source 230 and the video processor 104, and similar processing is performed.

In the electronic endoscope apparatus arranged in this manner, a plurality of electronic endoscopes, such as, for example, the bronchus electronic endoscope 232a, the upper digestive-organ electronic endoscope 232b, the lower digestive-organ electronic endoscope 232c and the like can selectively be connected. In the connected electronic endoscopes, the cable lengths are various such as 1 m, 2 m, 4 m and the like, depending upon the kinds thereof. However, by the use of the video processor 104 which employs any one of the present embodiments, the propagation delay time error due to the cable length is corrected so that signal processing is performed. In a case where the PLL lock is off, the cable-length correcting pulses are continuously transmitted to the CCD and drive the same, to detect the cable-length correcting pulses by the image pickup signal. Accordingly, there are provided functional advantages that it is possible to be drawn into a PLL lock condition by a simple arrangement for a short period of time, and it is possible to perform observation, medical treatment and the like by always stable images.

In the present invention, it will be apparent that different embodiments can be arranged within a wide scope, on the basis of the present invention, without departure of the split and the scope of the invention. The present invention should not be limited by specific embodiments, other than being limited by the appended claims.

What is claimed is:

1. An endoscope apparatus comprising:

an endoscope provided with an inserting section inserted into a lacuna;

image pickup means for image-picking-up an observing part within said lacuna; and signal processing means for driving said image pickup means and for processing an image pickup signal from said image pickup means;

wherein said signal processing means comprises:

timing-pulse generating means for generating a timing pulse signal for processing said image pickup signal output from said image pickup means;

drive-signal generating means for generating a drive signal for driving said image pickup means without receiving an external timing control signal from other parts, said drive-signal generating means being independent of said timing pulse signal;

signal superimposing means for superimposing a control signal upon said drive signal supplied to said image pickup means, said superimposing means being generated from said drive-signal generating means;

separating and extracting means for separating and extracting said control signal from said image pickup signal output from said image pickup means, wherein said control signal is superimposed upon said drive signal; and reference reset generating means separate from said drive-signal generating means for generating a reference reset signal for resetting timing pulse generating means for generating a timing pulse signal for processing said image pickup signal in response to an output from said separating and extracting means and said drive-signal generating means.

2. An endoscope apparatus according to claim 1, further comprising:

first transmitting means for transmitting a signal from said signal processing means to said image pickup means; and second transmitting means for transmitting said image pickup signal from said image pickup means, to said signal processing means, wherein said image pickup means and said signal processing means are physically independent.

3. An endoscope apparatus according to claim 1, wherein said timing pulse generating means is provided with a PLL circuit for generating a reference clock on the basis of said control signal separated and extracted by said separating and extracting means.

4. An endoscope apparatus according to claim 1, wherein said signal processing means is provided with sampling means for sampling said image pickup signal by said timing pulse, and wherein said separating and extracting means separates and extracts said control signal in response to an output from said sampling means.

5. An endoscope apparatus according to claim 1, wherein said endoscope is an electronic endoscope in which said image pickup means is arranged adjacent to a forward end of said inserting section.

6. An endoscope apparatus according to claim 1, wherein said signal superimposing means superimposes said control signal during a period of time corresponding to non-image information transmitting portion of said image pickup signal.

7. An endoscope apparatus according to claim 3, wherein said drive-signal generating means drives said image pickup means by at least a drawing signal for drawing said PLL circuit into a PLL during a predetermined period of time from start of generation of said drive signal.

8. An endoscope apparatus according to claim 3, wherein said drive-signal generating means drives said image pickup means by at least a drawing signal for drawing said PLL circuit into a PLL when a PLL lock of said PLL circuit is off.

9. An endoscope apparatus according to claim 3, wherein said signal processing means is provided with sampling means for sampling said image pickup signal by said timing pulse, and wherein said image pickup means is driven by at least a drawing signal for drawing said PLL circuit into a PLL on the basis of said image pickup signal which is sampled by said sampling means.

10. An endoscope apparatus according to claim 3, wherein said drive-signal generating means drives said image pickup means by at least a drawing signal for drawing said PLL circuit into a PLL, during a predetermined period of time until peak-value correction of said drive signal is ended.

11. An endoscope apparatus according to claim 4 wherein said sampling means is a correlation double sampling circuit.

12. An endoscope apparatus according to claim 11, including a plurality of electronic endoscopes different in inserting length of said inserting section from each other, wherein said signal control means controls said plurality of electronic endoscopes.

\* \* \* \* \*